United States Patent
Kang et al.

(10) Patent No.: US 12,543,471 B2
(45) Date of Patent: Feb. 3, 2026

(54) DISPLAY DEVICE HAVING IMPROVED SENSING RELIABILITY

(71) Applicant: Samsung Display Co., Ltd., Yongin-Si (KR)

(72) Inventors: Bongil Kang, Seongnam-si (KR); Gayeon Yun, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 639 days.

(21) Appl. No.: 17/698,153

(22) Filed: Mar. 18, 2022

(65) Prior Publication Data

US 2023/0008273 A1    Jan. 12, 2023

(30) Foreign Application Priority Data

Jul. 9, 2021 (KR) .................. 10-2021-0090515

(51) Int. Cl.
*H10K 59/40* (2023.01)
*G06F 3/044* (2006.01)
*H10K 59/131* (2023.01)

(52) U.S. Cl.
CPC ........... *H10K 59/40* (2023.02); *G06F 3/0446* (2019.05); *H10K 59/131* (2023.02)

(58) Field of Classification Search
CPC .......... H10K 59/40; G06F 2203/04103; G06F 3/0448; G06F 3/044; G06F 3/0446; G06F 3/0412; G06F 3/04164; G06F 2203/04107
See application file for complete search history.

(56) References Cited

U.S. PATENT DOCUMENTS

| | | | |
|---|---|---|---|
| 7,586,576 B2 | 9/2009 | Park et al. | |
| 10,993,311 B2 | 4/2021 | Lim | |
| 11,419,212 B2 | 8/2022 | Xiong et al. | |
| 2013/0277197 A1* | 10/2013 | Mi ........................ | G06F 3/0445 |
| | | | 200/600 |

(Continued)

FOREIGN PATENT DOCUMENTS

| CN | 111511109 A | 8/2020 |
|---|---|---|
| KR | 10-1171178 B1 | 8/2012 |

(Continued)

*Primary Examiner* — Chad M Dicke
*Assistant Examiner* — Jeremy Daniel Watts
(74) *Attorney, Agent, or Firm* — Innovation Counsel LLP

(57) ABSTRACT

A display device includes a display module, a flexible circuit film, a sensor controller, and a cover layer. The display module includes a display panel and an input sensor including a sensing electrode. The flexible circuit film includes a first conductive pattern, a second conductive pattern receiving a reference voltage, and a signal line electrically connected to the sensing electrode. The sensor controller is electrically connected to the signal line and the second conductive pattern and is disposed on the flexible circuit film. The cover layer is disposed on the flexible circuit film and includes a first conductive layer electrically connected to the first conductive pattern and overlapping the signal line, a second conductive layer disposed on the first conductive layer, electrically connected to the second conductive pattern, and overlapping the signal line, and a first insulating layer disposed between the first conductive layer and the second conductive layer.

13 Claims, 15 Drawing Sheets

(56) References Cited

U.S. PATENT DOCUMENTS

| | | | |
|---|---|---|---|
| 2015/0042903 A1* | 2/2015 | Misaki | G06F 3/04164 |
| | | | 349/12 |
| 2019/0012031 A1* | 1/2019 | Kim | H10K 50/805 |
| 2021/0118958 A1* | 4/2021 | Park | H10K 59/131 |
| 2021/0168973 A1 | 6/2021 | Sim et al. | |
| 2022/0057910 A1* | 2/2022 | Xiong | H05K 1/147 |

FOREIGN PATENT DOCUMENTS

| | | |
|---|---|---|
| KR | 10-2019-0121469 A | 10/2019 |
| KR | 10-2020-0047811 A | 5/2020 |

\* cited by examiner

DISPLAY DEVICE HAVING IMPROVED SENSING RELIABILITY

CROSS-REFERENCE TO RELATED APPLICATION

This U.S. non-provisional patent application claims priority under 35 U.S.C. § 119 to Korean Patent Application No. 10-2021-0090515, filed on Jul. 9, 2021, the contents of which are hereby incorporated by reference in its entirety.

BACKGROUND

1. Field of Disclosure

The present disclosure relates to a display device. More particularly, the present disclosure relates to a display device having improved sensing reliability.

2. Description of the Related Art

Multimedia electronic devices, such as televisions, mobile phones, tablet computers, navigation units, and game units, include a display device to display images. The display device includes an input sensor that provides a touch-based input method allowing users to easily and intuitively input information or commands in addition to the usual input methods using a button, a keyboard, a mouse, etc. The input sensor senses a touch event or an input generated by user's body.

SUMMARY

The present disclosure provides a display device having improved sensing reliability.

Embodiments of the inventive concept provide a display device including a display module including a display panel and an input sensor including a sensing electrode and disposed on the display panel, a flexible circuit film electrically connected to the display module and including a first conductive pattern, a second conductive pattern receiving a reference voltage, and a signal line electrically connected to the sensing electrode, a sensor controller electrically connected to the signal line and the second conductive pattern and disposed on the flexible circuit film, and a cover layer disposed on the flexible circuit film and including a first conductive layer electrically connected to the first conductive pattern and overlapping the signal line, a second conductive layer disposed on the first conductive layer, electrically connected to the second conductive pattern, and overlapping the signal line, and a first insulating layer disposed between the first conductive layer and the second conductive layer.

The display device further includes a conductive adhesive layer disposed between the cover layer and the flexible circuit film to electrically connect the first conductive pattern to the first conductive layer or to electrically connect the second conductive pattern to the second conductive layer.

The first conductive pattern has a line shape and extends along a portion of the signal line.

The first conductive pattern includes a first line portion electrically connected to the sensor controller, a second line portion electrically connected to the first conductive layer, and an electrode portion disposed between the first line portion and the second line portion, and a width of the electrode portion is greater than a width of the first line portion.

The width of the electrode portion is greater than or equal to about 50 micrometers.

The electrode portion overlaps the signal line in a plan view.

The first line portion is disposed on a layer different from a layer on which the electrode portion is disposed.

The signal line is disposed between the electrode portion and the first conductive layer.

The cover layer further includes a second insulating layer disposed on the second conductive layer.

The flexible circuit film further includes an insulating layer disposed on the first conductive pattern, the second conductive pattern, and the signal line.

The insulating layer is provided with a first contact portion defined therethrough to expose a portion of the first conductive pattern, and the first conductive layer is electrically connected to the first conductive pattern through the first contact portion.

The insulating layer is provided with a second contact portion defined therethrough to expose a portion of the second conductive pattern, and the second conductive layer is electrically connected to the second conductive pattern through the second contact portion.

The sensing electrode is provided in plural, and the sensing electrodes include a first sensing electrode and a second sensing electrode insulated from the first sensing electrode to form a mutual capacitance.

Embodiments of the inventive concept provide a display device including a display module including a display panel and an input sensor including a sensing electrode and disposed on the display panel, a flexible circuit film electrically connected to the display module, a sensor controller disposed on the flexible circuit film, and a cover layer disposed on the flexible circuit film and including a connection pattern and a conductive layer insulated from the connection pattern and disposed on the connection pattern. The flexible circuit film includes a first conductive line electrically connected to the sensor controller, a second conductive line electrically connected to the sensing electrode, and a conductive pattern receiving a reference voltage. The connection pattern electrically connects the first conductive line to the second conductive line, and the conductive layer is electrically connected to the conductive pattern and overlaps the connection pattern.

The flexible circuit film further includes a signal line electrically connected to the sensor controller and the sensing electrode, and the conductive layer overlaps the signal line.

The display device further includes a conductive adhesive layer disposed between the cover layer and the flexible circuit film to electrically connect the first conductive line to the connection pattern or to electrically connect the conductive pattern to the conductive layer.

The display device further includes a first insulating layer disposed between the connection pattern and the conductive layer and a second insulating layer disposed on the conductive layer.

The flexible circuit film further includes a first contact portion electrically connecting the first conductive line to the connection pattern and a second contact portion electrically connecting the second conductive line to the connection pattern.

The connection pattern has a line shape and each of the sensing electrode, the first conductive line, the second conductive line, and the connection pattern is provided in plural.

Each of the first conductive line, the second conductive line, and the connection pattern is provided in plural, the connection patterns are disposed on different layers from each other, and each of the connection patterns is electrically connected to a corresponding first conductive line among the first conductive lines and a corresponding second conductive line among the second conductive lines.

According to the above, the cover layer including the conductive layers is disposed on the flexible circuit film. One conductive layer of the cover layer is electrically connected to the conductive pattern applying the reference voltage to be stably grounded. Thus, a parasitic capacitance between the signal lines and the conductive layer of the cover layer is maintained at a constant level without being changed. Accordingly, a ghost touch phenomenon occurring when a touch event is not actually generated is prevented.

The other conductive layer of the cover layer is electrically connected to the conductive pattern which is connected to the sensor controller, and the parasitic capacitance occurring in the conductive pattern is measured. Therefore, whether the cover layer is delaminated or not is identified. Since it is able to detect a defective product to replace the defective product with a normal product during a manufacturing process. Thus, a sensing reliability of the display device is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1A:
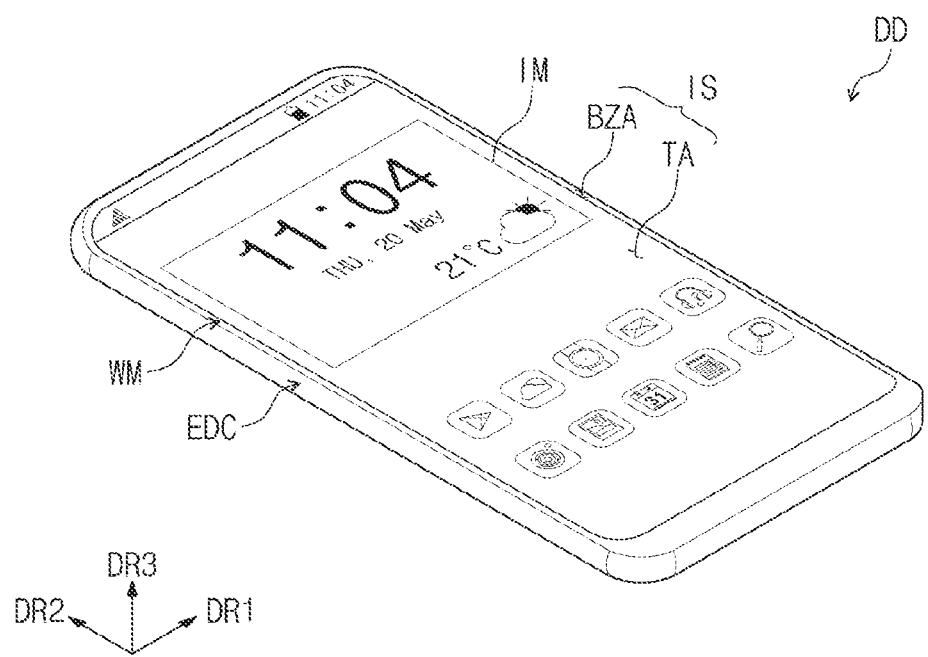
FIG. 1A is a perspective view showing a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Hereinafter, the present disclosure will be explained in detail with reference to the accompanying drawings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 1B:
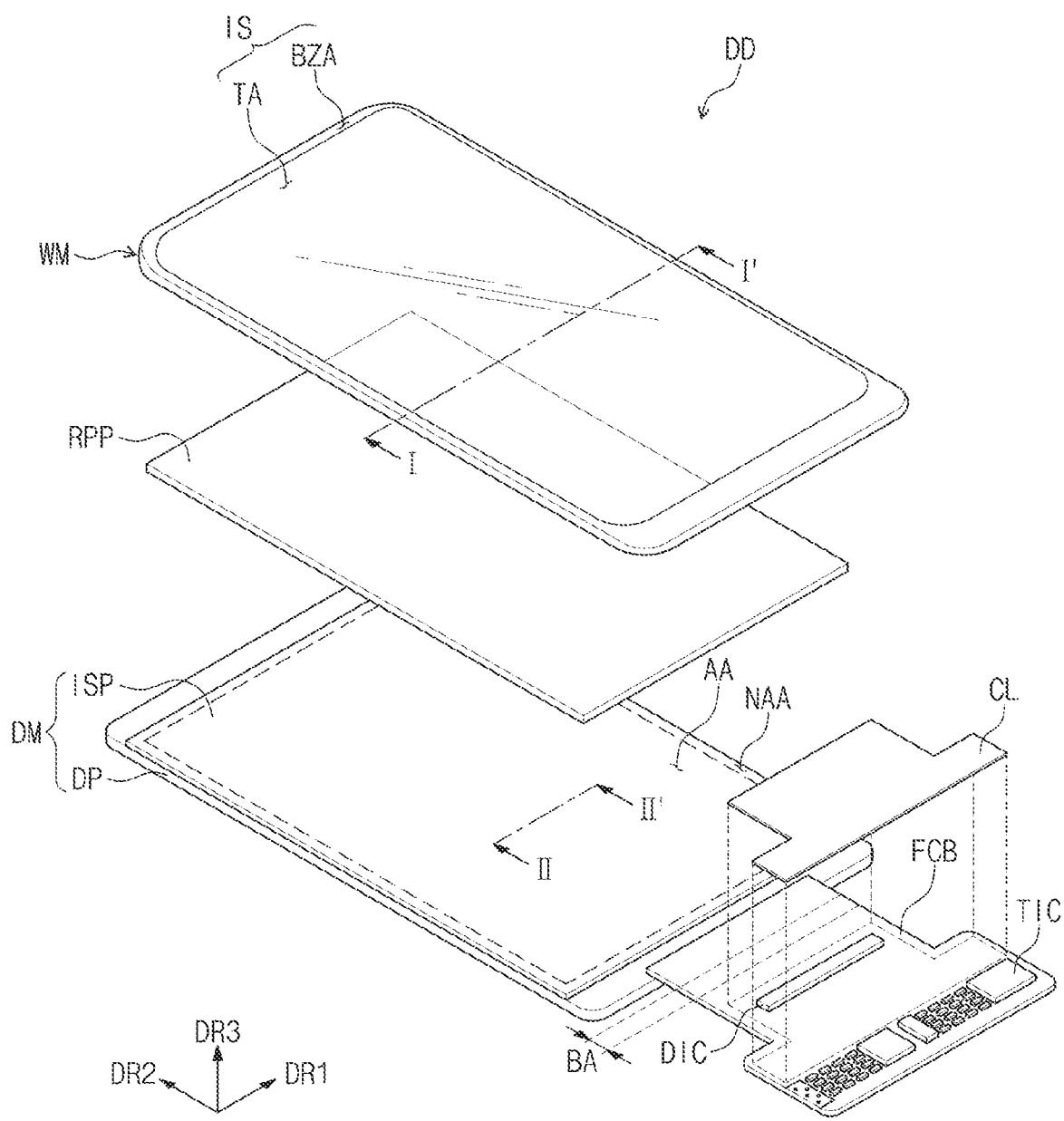
FIG. 1B is an exploded perspective view showing a display device according to an embodiment of the present disclosure.
Figure 1C:
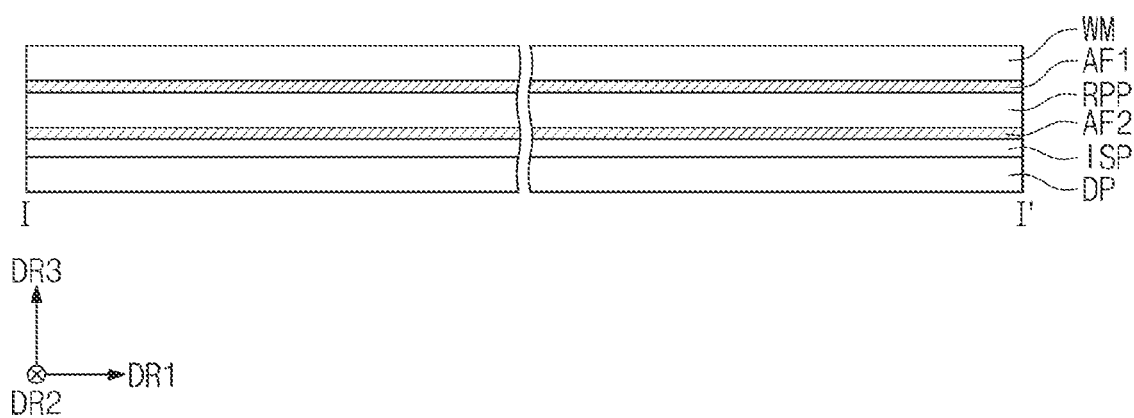
FIG. 1C is a cross-sectional view taken along a line I-I' of FIG. 1B.
Figure 2:
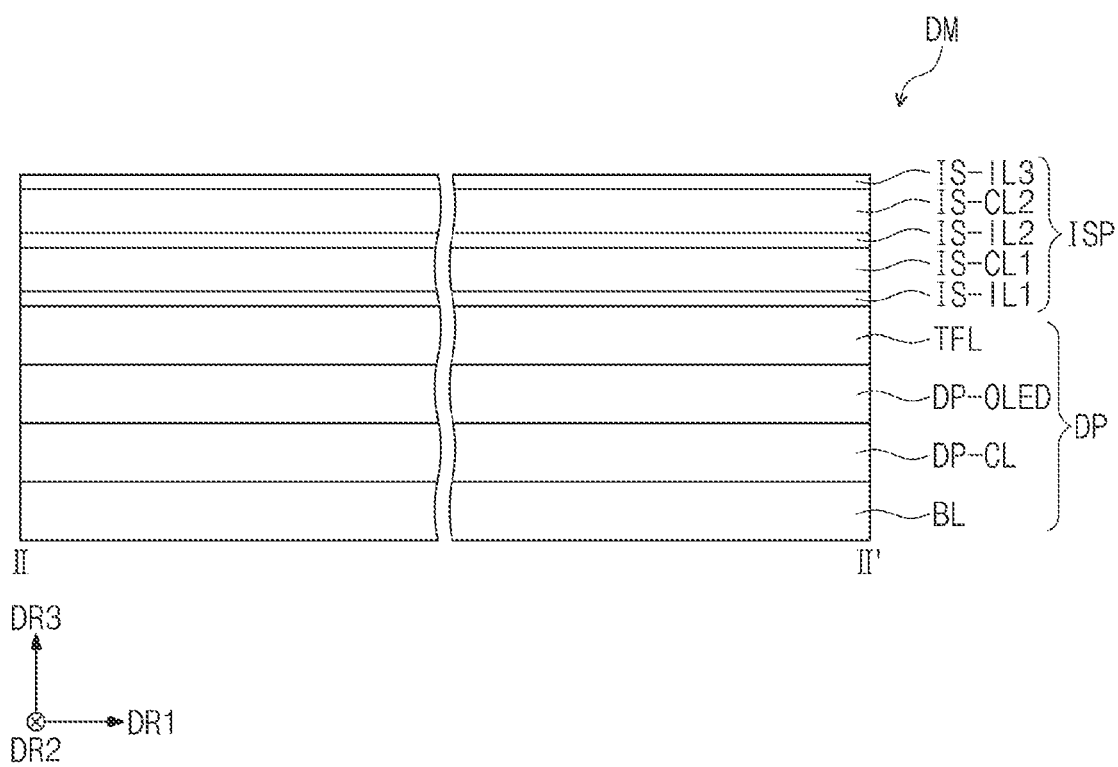
FIG. 2 is a cross-sectional view taken along a line II-IP of FIG. 1B.

FIG. 1A is a perspective view showing a display device DD according to an embodiment of the present disclosure. FIG. 1B is an exploded perspective view showing the display device DD according to an embodiment of the present disclosure. FIG. 1C is a cross-sectional view taken along a line I-I' of FIG. 1B. FIG. 2 is a cross-sectional view taken along a line II-II' of FIG. 1B. FIG. 1C shows a cross-section of the display device DD according to an embodiment, and FIG. 2 shows a cross-section of a display module DM according to an embodiment.

Referring to FIG. 1A, the display device DD may be a device that is activated in response to electrical signals. The display device DD may include various embodiments. For example, the display device DD may be applied to electronic devices, such as a smart watch, a tablet computer, a notebook computer, a computer, a smart television, or the like.

The display device DD may display an image IM through a display surface IS, which is substantially parallel to each of a first direction DR1 and a second direction DR2, toward a third direction DR3. The display surface IS through which the image IM is displayed may correspond to a front surface of the display device DD. The image IM may include a moving image and a still image.

In the present embodiment, front (or upper) and rear (or lower) surfaces of each member of the display device DD may be defined with respect to a direction in which the image IM is displayed. The front and rear surfaces may be opposite to each other in the third direction DR3, and a normal line direction of each of the front and rear surfaces may be substantially parallel to the third direction DR3.

A separation distance in the third direction DR3 between the front surface and a rear surface of the display device DD may correspond to a thickness/height in the third direction DR3 of the display device DD. Meanwhile, directions indicated by the first, second, and third directions DR1, DR2, and DR3 are relative to each other, and thus, the directions indicated by the first, second, and third directions DR1, DR2, and DR3 may be changed to other directions.

The display device DD may sense an external input applied thereto from the outside. The external input may include a variety of external inputs provided from the outside of the display device DD. For example, the external input may include an external input (e.g., a hovering input) applied when in proximity to or approaching close to the display device DD at a predetermined distance as well as a touch input by a user's body part, e.g., a hand of a user. In addition, the external input may include various forms, such as force, pressure, temperature, or light, however, it should not be limited thereto or thereby.

The front surface of the display device DD may include a transmission area TA and a bezel area BZA. The image IM may be displayed through the transmission area TA. The user may view the image IM through the transmission area TA. In the present embodiment, the transmission area TA may have a quadrangular shape with rounded corners. However, this is merely one example and the transmission area TA may have a variety of shapes and should not be particularly limited.

The bezel area BZA may be defined adjacent to the transmission area TA. The bezel area BZA may have a predetermined color. The bezel area BZA may surround the transmission area TA. Accordingly, the shape of the transmission area TA may be defined by the bezel area BZA, however, this is merely one example. According to an embodiment, the bezel area BZA may be disposed adjacent to only one side of the transmission area TA or may be omitted. The display device DD may be implemented in various embodiments and it should not be particularly limited.

Referring to FIGS. 1B and 1C, the display device DD may include a window WM, an anti-reflective film RPP, and a display module DM. The window WM may include a transparent material through which an image transmits. For example, the window WM may include glass, sapphire, or plastic. The window WM is shown as a single layer, however, it should not be limited thereto or thereby. The window WM may include plural layers. Meanwhile, although not shown in figures, the bezel area BZA of the display device DD may be obtained by printing a material having the predetermined color on an area of the window WM.

The anti-reflective film RPP may be disposed under the window WM. The anti-reflective film RPP may reduce a reflectance of an external light incident thereto from above the window WM. The anti-reflective film RPP may include a retarder and/or a polarizer. The retarder may be a film type or liquid crystal coating type and may include a 212 retarder and/or a 214 retarder. The polarizer may be a film type or liquid crystal coating type. The film type polarizer and the film type retarder may include a stretching type synthetic resin film, and the liquid crystal coating type polarizer and the liquid crystal coating type retarder may include liquid crystals aligned in a predetermined alignment. The retarder and the polarizer may be implemented as one polarizing film. The anti-reflective film RPP may further include a protective film disposed above or below the polarizing film.

The display module DM may be disposed under the anti-reflective film RPP. A functional layer, e.g., a protective layer, may be further disposed between the display module DM and the window WM in addition to the anti-reflective film RPP.

The display module DM may include an input sensor ISP and a display panel DP disposed under the input sensor ISP. The display panel DP may generate the image and the input sensor ISP may obtain coordinate information of the external input (e.g., touch event). Accordingly, the display module DM may display images in response to electrical signals and may transmit and receive information about the external input.

The display module DM may include an active area AA and a peripheral area NAA, which are defined therein. The active area AA may be an area from which images provided from the display module DM are emitted. The peripheral area NAA may be defined adjacent to the active area AA. As an example, the peripheral area NAA may surround the active area AA, however, this is merely one example. The peripheral area NAA may have a variety of shapes and should not be particularly limited. According to an embodiment, the active area AA of the display module DM may correspond to the transmission area TA of the display surface IS.

The display module DM may further include a flexible circuit film FCB and a panel driver DIC. The flexible circuit film FCB may be electrically connected to the display panel DP. The flexible circuit film FCB may be coupled to pads in the peripheral area NAA of the display panel DP by a bonding process. The panel driver DIC may be a panel driving chip mounted on the flexible circuit film FCB and electrically connected to the display panel DP. The panel driving chip may include driving elements, e.g., a data driving circuit, to drive a pixel of the display panel DP. FIG. 1B shows a structure in which the panel driver DIC is mounted on the flexible circuit film FCB, however, the structure should not be limited thereto or thereby. As an example, the panel driver DIC may be directly mounted in the peripheral area NAA of the display panel DP.

The display module DM may further include a sensor controller TIC to drive the input sensor ISP. The sensor controller TIC may be a sensor driving chip mounted on the flexible circuit film FCB and electrically connected to the input sensor ISP. The display module DM may further include a plurality of driving elements mounted on the flexible circuit film FCB. The driving elements may include a circuit part to convert signals applied thereto from the outside to signals required for the panel driving chip and the sensor driving chip or to signals to drive the display panel DP.

Referring to FIG. 1B, the flexible circuit film FCB may include a bending area BA. The bending area BA may be bent with respect to an imaginary axis extending in the first direction DR1. As the bending area BA of the flexible circuit film FCB is bent, a portion of the flexible circuit film FCB may be disposed on a rear side of the display module DM, and the panel driver DIC and the sensor controller TIC may be disposed under the display module DM.

According to an embodiment, a cover layer CL may be disposed on the flexible circuit film FCB. The cover layer CL may cover at least a portion of the flexible circuit film FCB. According to an embodiment, the cover layer CL may cover the panel driver DIC. The cover layer CL may prevent an external electronic module from interfering with the panel driver DIC. For instance, when the display device DD is applied to the electronic device such as the mobile phone, the cover layer CL may prevent interference between a main board and the panel driver DIC.

FIG. 1B shows a structure in which a width of the cover layer CL in the first direction DR1 is changed to correspond to a shape of the flexible circuit film FCB as a representative example, however, it should not be limited thereto or thereby. As an example, the width in the first direction DR1 of the cover layer CL may have a fixed width as long as the cover layer CL has a width greater than a width of the panel driver DIC. The cover layer CL will be described in detail later.

Referring to FIG. 1C, the window WM, the anti-reflective film RPP, and the input sensor ISP may be coupled with each other by an adhesive film. A first adhesive film AF1 may be disposed between the window WM and the anti-reflective film RPP, and a second adhesive film AF2 may be disposed between the anti-reflective film RPP and the input sensor ISP.

According to an embodiment, the first and second adhesive films AF1 and AF2 may include an optically clear adhesive (OCA) film. However, the first and second adhesive films AF1 and AF2 should not be limited thereto or thereby. According to an embodiment, the first and second adhesive films AF1 and AF2 may include a well-known adhesive. As an example, the first and second adhesive films AF1 and AF2 may include an optically clear resin (OCR) or a pressure sensitive adhesive (PSA) film.

Referring to FIG. 2, the display module DM may include the display panel DP and the input sensor ISP disposed on the display panel DP. The display panel DP may include a base layer BL, a circuit layer DP-CL, a light emitting element layer DP-OLED, and an encapsulation layer TFL. The base layer BL may include a synthetic resin layer. The synthetic resin layer may include a heat-curable resin. The base layer BL may have a multi-layer structure. For instance, the base layer BL may have a three-layer structure of a synthetic resin layer, an adhesive layer, and a synthetic resin layer.

In particular, the synthetic resin layer may be a polyimide-based resin layer, and a material for the synthetic resin layer should not be particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. The base layer BL may include a glass substrate, or an organic/inorganic composite material substrate.

The circuit layer DP-CL may be disposed on the base layer BL. The circuit layer DP-CL may include an insulating layer, a semiconductor pattern, a conductive pattern, and a signal line. An insulating layer, a semiconductor layer, and a conductive layer may be formed on the base layer BL by a coating or depositing process. Then, the insulating layer, the semiconductor layer, and the conductive layer may be selectively patterned through several photolithography processes.

The light emitting element layer DP-OLED may be disposed on the circuit layer DP-CL. The light emitting element layer DP-OLED may include a light emitting element. For example, the light emitting element layer DP-OLED may include an organic light emitting material, a quantum dot, a quantum rod, or a micro-LED.

The encapsulation layer TFL may be disposed on the light emitting element layer DP-OLED. The encapsulation layer TFL may include an inorganic layer, an organic layer, and an inorganic layer, which are sequentially stacked, however, the layers of the encapsulation layer TFL should not be limited thereto or thereby.

The inorganic layers may protect the light emitting element layer DP-OLED from moisture and oxygen, and the organic layer may protect the light emitting element layer DP-OLED from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, however, it should not be limited thereto or thereby.

The input sensor ISP may include a first sensing insulating layer IS-IL1 (hereinafter, referred to as a base insulating layer), a first sensing conductive layer IS-CL1, a second sensing insulating layer IS-IL2 (hereinafter, referred to as an intermediate insulating layer), a second sensing conductive layer IS-CL2, and a third sensing insulating layer IS-IL3 (hereinafter, referred to as a protective insulating layer). The input sensor ISP may be formed through successive processes after the display panel DP is formed. In this case, the input sensor ISP may be directly disposed on the display panel DP. In the present disclosure, the expression "the input sensor ISP is disposed directly on the display panel DP" means that no intervening elements are present between the input sensor ISP and the display panel DP. That is, a separate adhesive member may not be disposed between the input sensor ISP and the display panel DP. According to an embodiment, the input sensor ISP may be coupled with the display panel DP by the adhesive member. The adhesive member may include a well-known adhesive.

The base insulating layer IS-IL1 may be disposed directly on the display panel DP. As an example, the base insulating layer IS-IL1 may be directly contact the inorganic layer of the encapsulation layer TFL. The base insulating layer IS-IL1 may have a single-layer or multi-layer structure. According to an embodiment, the base insulating layer IS-IL1 may be omitted.

Each of the first sensing conductive layer IS-CL1 and the second sensing conductive layer IS-CL2 may have a single-layer structure or a multi-layer structure of layers stacked in the third direction DR3. The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), and indium tin zinc oxide (ITZO). Further, the transparent conductive layer may include a conductive polymer such as PEDOT, a metal nanowire, a graphene, or the like.

The conductive layer having the multi-layer structure may include metal layers. As an example, the metal layers may have a three-layer structure of titanium/aluminum/titanium.

The conductive layer having the multi-layer structure may include at least one metal layer and at least one transparent conductive layer.

Each of the first sensing conductive layer IS-CL1 and the second sensing conductive layer IS-CL2 may include patterns forming sensing electrodes. The input sensor ISP may obtain information about external input based on a variation in mutual capacitance between the sensing electrodes.

The intermediate insulating layer IS-IL2 may be disposed between the first sensing conductive layer IS-CL1 and the second sensing conductive layer IS-CL2 and may cover the first sensing conductive layer IS-CL1. A portion of the second sensing conductive layer IS-CL2 may be electrically connected to a portion of the first sensing conductive layer IS-CL1 via a contact hole defined through the intermediate insulating layer IS-IL2. The protective insulating layer IS-IL3 may be disposed above the intermediate insulating layer IS-IL2 and may cover the second sensing conductive layer IS-CL2.

At least one of the intermediate insulating layer IS-IL2 and the protective insulating layer IS-IL3 may include an inorganic layer. The inorganic layer may include at least one of aluminum oxide, titanium oxide, silicon oxide, silicon oxynitride, zirconium oxide, and hafnium oxide.

At least one of the intermediate insulating layer IS-IL2 and the protective insulating layer IS-IL3 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 3A:
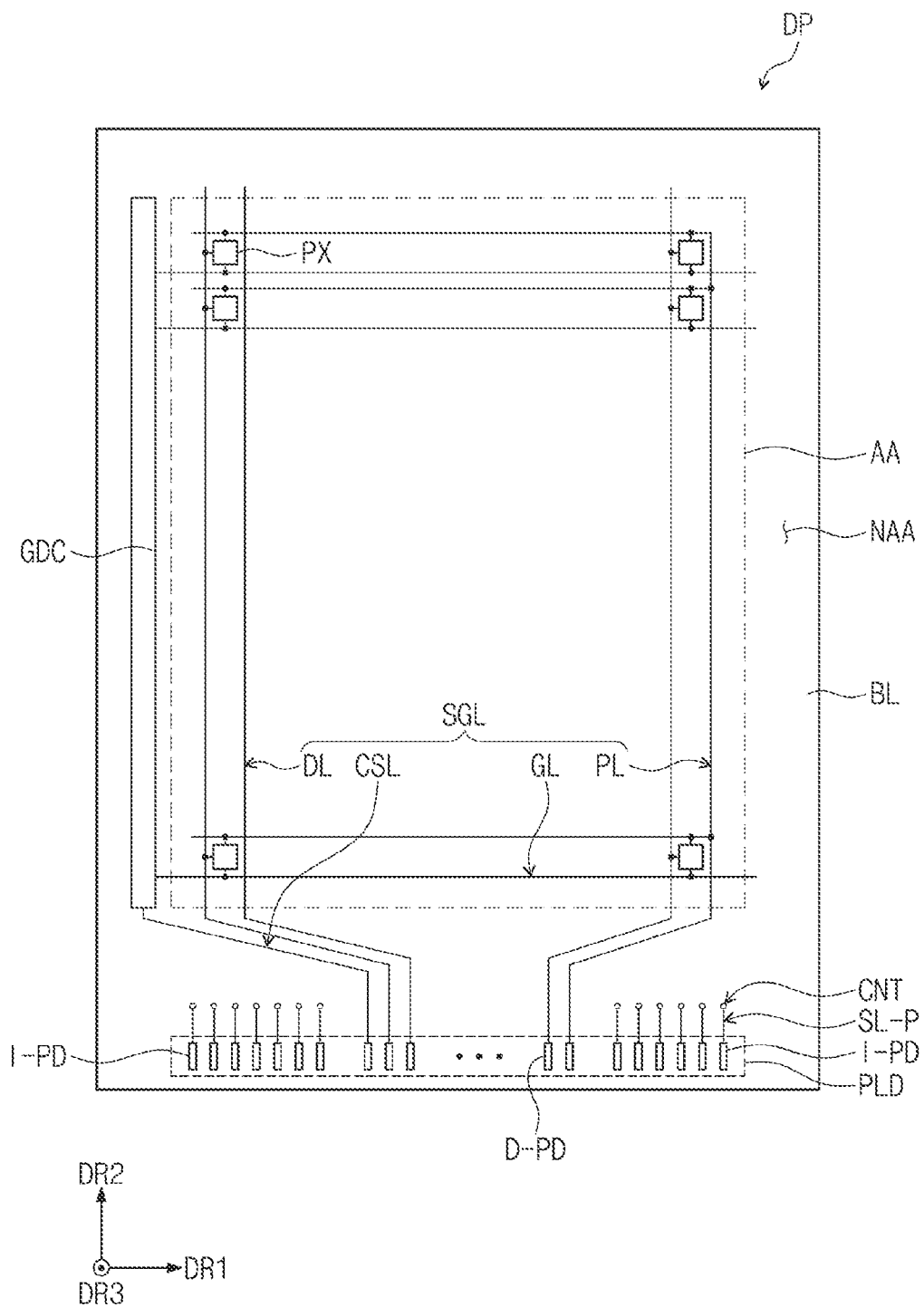
FIG. 3A is a plan view showing a display panel according to an embodiment of the present disclosure.
Figure 3B:
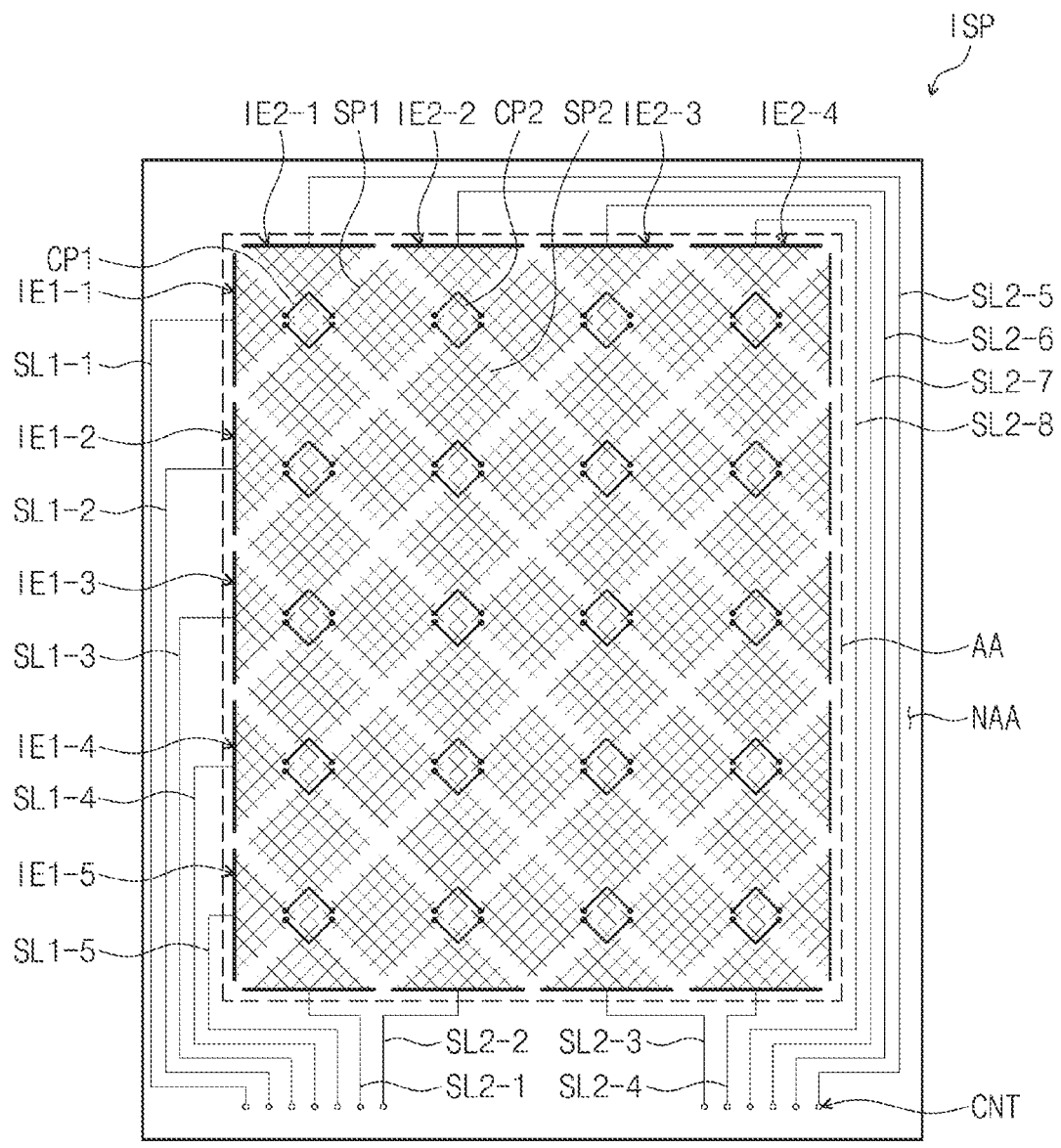
FIG. 3B is a plan view showing an input sensor according to an embodiment of the present disclosure.

FIG. 3A is a plan view showing the display panel DP according to an embodiment of the present disclosure. FIG. 3B is a plan view showing the input sensor ISP according to an embodiment of the present disclosure.

Referring to FIG. 3A, the display panel DP may include a driving circuit GDC, a plurality of signal lines SGL, and a plurality of pixels PX. The display panel DP may further include a pad part PLD disposed in the peripheral area NAA.

The pixels PX may be arranged in the active area AA. Each of the pixels PX may include a light emitting element and a pixel driving circuit connected to the light emitting element. The light emitting element may include an organic light emitting diode. The driving circuit GDC, the signal lines SGL, the pad part PLD, and the pixel driving circuit may be included in the circuit layer DP-CL shown in FIG. 2.

The driving circuit GDC may include a gate driving circuit. The gate driving circuit may generate a plurality of gate signals and may sequentially output the gate signals to a plurality of gate lines GL described later. The gate driving circuit may further output another control signal to the pixel driving circuit.

The signal lines SGL may include the gate lines GL, data lines DL, a power line PL, and a control signal line CSL. Each of the gate lines GL may be connected to corresponding pixels among the pixels PX, and each of the data lines DL may be connected to corresponding pixels among the pixels PX. The power line PL may be connected to the pixels PX. The control signal line CSL may provide control signals to the gate driving circuit. The signal lines SGL may overlap the active area AA and the peripheral area NAA.

The pad part PLD may be connected to the flexible circuit film FCB (refer to FIG. 1B) and may include pixel pads D-PD to electrically connect the flexible circuit film FCB to the display panel DP and input pads I-PD to electrically connect the flexible circuit film FCB to the input sensor ISP. The pixel pads D-PD and the input pads I-PD may be exposed portions of conductive lines that are arranged in the circuit layer DP-CL and are not covered by an insulating layer included in the circuit layer DP-CL.

The pixel pads D-PD may be connected to corresponding pixels PX via the signal lines SGL. In addition, any one of the pixel pads D-PD may be connected to the driving circuit GDC.

Referring to FIG. 3B, the input sensor ISP according to an embodiment may include first sensing electrodes IE1-1 to IE1-5, first signal lines SL1-1 to SL1-5 connected to the first sensing electrodes IE1-1 to IE1-5, respectively, second sensing electrodes IE2-1 to IE2-4, and second signal lines SL2-1 to SL2-4 connected to the second sensing electrodes IE2-1 to IE2-4, respectively. As an example, the input sensor ISP may further include third signal lines SL2-5 to SL2-8 connected to the second sensing electrodes IE2-1 to IE2-4. In this case, the second signal lines SL2-1 to SL2-4 may be connected to one ends of the second sensing electrodes IE2-1 to IE2-4, and the third signal lines SL2-5 to SL2-8 may be connected to the other ends of the second sensing electrodes IE2-1 to IE2-4, respectively.

The first sensing electrodes IE1-1 to IE1-5 may cross the second sensing electrodes IE2-1 to IE2-4. The first sensing electrodes IE1-1 to IE1-5 and the second sensing electrodes IE2-1 to IE2-4 may be insulated from each other to form a mutual capacitance. The first sensing electrodes IE1-1 to IE1-5 may be arranged in the second direction DR2 and may extend in the first direction DR1. The second sensing electrodes IE2-1 to IE2-4 may be arranged in the first direction DR1 and may extend in the second direction DR2.

Each of the first sensing electrodes IE1-1 to IE1-5 may include first sensing portions SP1 and first connection portions CP1, which are disposed in the active area AA. Each of the second sensing electrodes IE2-1 to IE2-4 may include second sensing portions SP2 and second connection portions CP2, which are disposed in the active area AA.

FIG. 3B shows the first sensing electrodes IE1-1 to IE1-5 and the second sensing electrodes IE2-1 to IE2-4 according to an embodiment, however, shapes of the electrodes should not be limited thereto or thereby. According to an embodiment, the first sensing electrodes IE1-1 to IE1-5 and the second sensing electrodes IE2-1 to IE2-4 may have a shape in which the sensing portion and the connection portion are not distinguished from each other, for example, a bar shape. The first sensing portions SP1 and the second sensing portions SP2 having a rhombus shape are shown in FIG. 3B, however, they should not be limited thereto or thereby. The first sensing portions SP1 and the second sensing portions SP2 may have other polygonal shapes.

In one first sensing electrode, the first sensing portions SP1 may be arranged in the first direction DR1, and in one second sensing electrode, the second sensing portions SP2 may be arranged in the second direction DR2. Each of the first connection portions CP1 may connect first sensing portions SP1 adjacent to each other, and each of the second connection portions CP2 may connect second sensing portions SP2 adjacent to each other.

According to an embodiment, the second connection portions CP2 may correspond to the first sensing conductive layer IS-CL1 described with reference to FIG. 2, and the first sensing portions SP1, the first connection portions CP1, and the second sensing portions SP2 may correspond to the second sensing conductive layer IS-CL2 described with reference to FIG. 2. That is, the first sensing electrodes IE1-1 to IE1-5 may be disposed on the same layer as a layer on which the second sensing portions SP2 are disposed.

The first signal lines SL1-1 to SL1-5 may be respectively connected to one ends of the first sensing electrodes IE1-1 to IE1-5. According to an embodiment, the input sensor ISP may further include signal lines connected to the other ends of the first sensing electrodes IE1-1 to IE1-5.

The first signal lines SL1-1 to SL1-5, the second signal lines SL2-1 to SL2-4, and the third signal lines SL2-5 to SL2-8 may be disposed in the peripheral area NAA.

As described with reference to FIG. 3A, the input pads I-PD (refer to FIG. 3A) may be formed by conductive lines disposed in the circuit layer DP-CL of the display panel DP (refer to FIG. 2). Accordingly, portions SL-P (hereinafter, referred to as pad parts) of the first, second, and third signal lines SL1-1 to SL1-5, SL2-1 to SL2-4, and SL2-5 to SL2-8 of the input sensor ISP shown in FIG. 3A may be connected to the input pads I-PD which are disposed in the display panel DP. The pad parts SL-P may be electrically connected to the first, second, and third signal lines SL1-1 to SL1-5, SL2-1 to SL2-4, and SL2-5 to SL2-8 of the input sensor ISP via a contact hole CNT. The input pads I-PD may be connected to corresponding sensing electrodes through the pad parts SL-P and the first, second, and third signal lines SL1-1 to SL1-5, SL2-1 to SL2-4, and SL2-5 to SL2-8.

Figure 4:
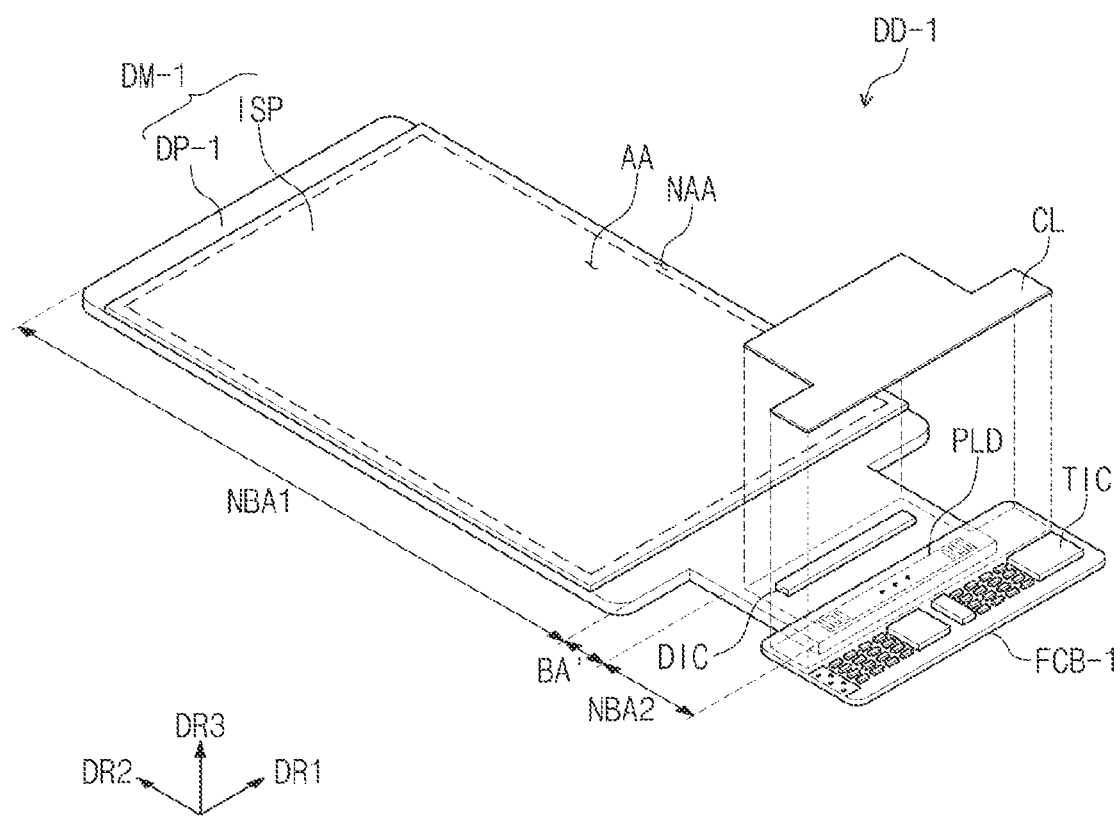
FIG. 4 is a perspective view showing some components of a display device according to an embodiment of the present disclosure.

FIG. 4 is a perspective view showing some components of a display device DD-1 according to an embodiment of the present disclosure. FIG. 4 shows a display module DM-1 including a display panel DP-1 and an input sensor ISP, a flexible circuit film FCB-1, and a cover layer CL of the display device DD-1. The display panel DP-1 and the flexible circuit film FCB-1 of FIG. 4 may be different from the display panel DP and the flexible circuit film FCB of FIG. 1B. In FIG. 4, the same/similar reference numerals denote the same/similar elements in FIGS. 1A to 3B, and thus, detailed descriptions of the same/similar elements will be omitted.

The display panel DP-1 may include a first non-bending area NBA1, a bending area BA', and a second non-bending area NBA2, which are sequentially arranged in a direction opposite to the second direction DR2. The bending area BA' may be defined as a portion that is bent with respect to a predetermined axis extending in the first direction DR1. As the bending area BA' is bent, the second non-bending area NBA2 may be disposed under the first non-bending area NBA1.

The first non-bending area NBA1 of the display panel DP-1 may include an active area AA including pixels PX (refer to FIG. 3A). An area of the first non-bending area NBA1 except the active area AA, the bending area BA', and the second non-bending area NBA2 may correspond to a peripheral area NAA.

The second non-bending area NBA2 of the display panel DP-1 may include a panel driver DIC mounted therein and a pad part PLD disposed adjacent to an end thereof. The flexible circuit film FCB-1 may be disposed on the pad part PLD of the second non-bending area NBA2 and may be electrically connected to the display module DM-1.

According to the present embodiment, the cover layer CL may be disposed on the flexible circuit film FCB-1 and the display panel DP-1. The cover layer CL may be disposed to overlap at least a portion of the second non-bending area NBA2 of the display panel DP-1. According to an embodiment, the cover layer CL may cover the panel driver DIC disposed in the second non-bending area NBA2.

Hereinafter, the following descriptions will be based on the display device DD in which the flexible circuit film FCB shown in FIG. 1B is bent, however, descriptions about all components of the display device DD may be applied to the display device DD-1 in which the display panel DP-1 is bent. In this case, the flexible circuit film FCB-1 may correspond to a second area A2 of a flexible circuit film FCB described later with reference to FIGS. 5A, 6A, and 7A.

Figure 5A:
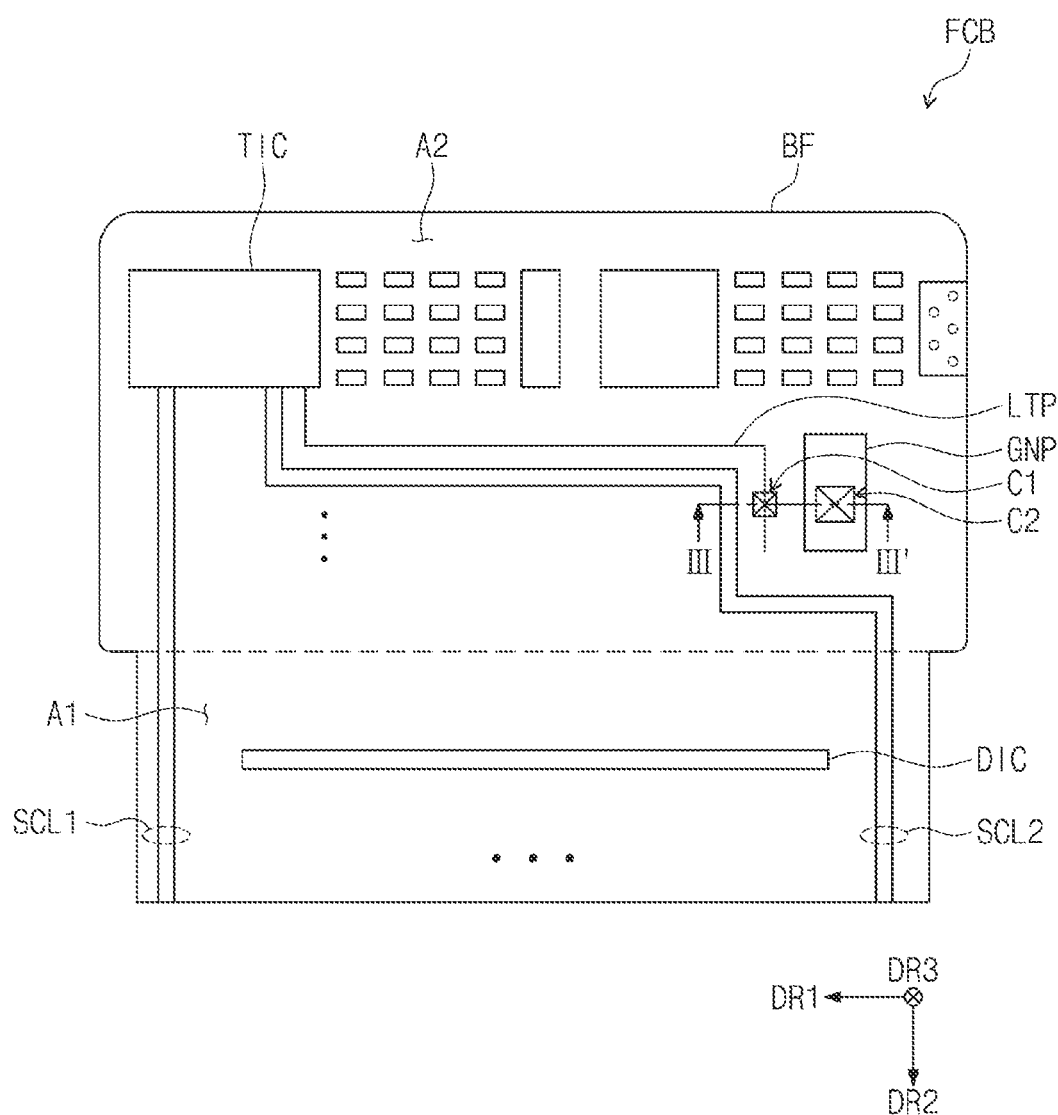
FIG. 5A is a plan view showing a flexible circuit film according to an embodiment of the present disclosure.
Figure 5B:
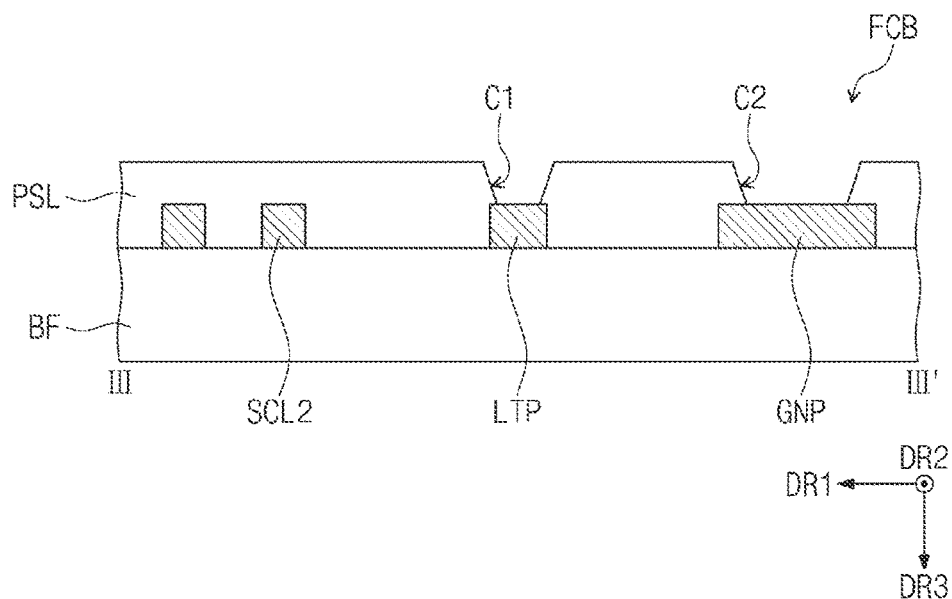
FIG. 5B is a cross-sectional view taken along a line of FIG. 5A.
Figure 5C:
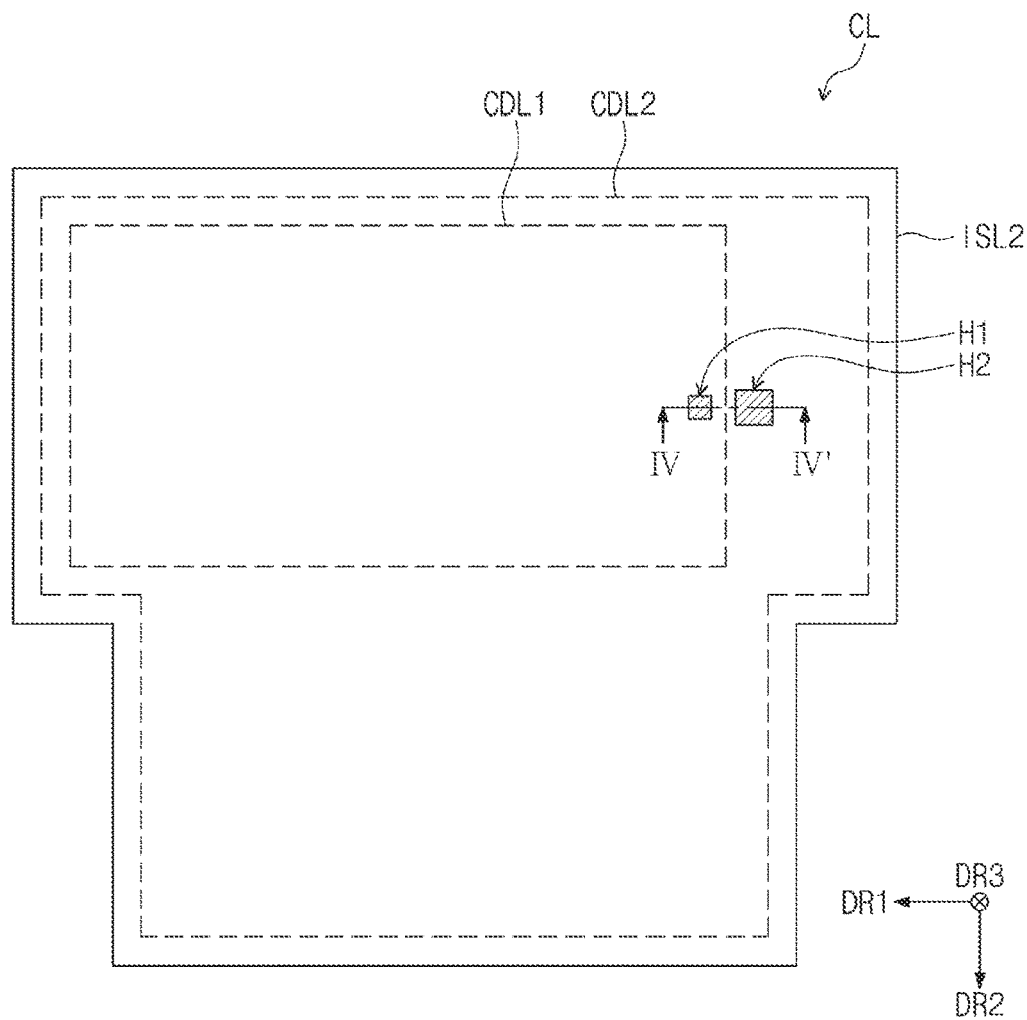
FIG. 5C is a plan view showing a cover layer according to an embodiment of the present disclosure.
Figure 5D:
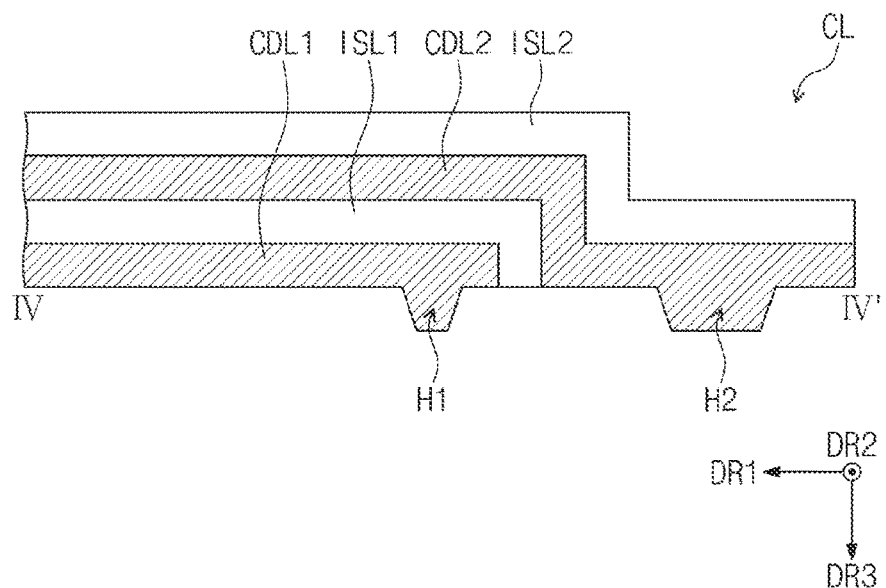
FIG. 5D is a cross-sectional view taken along a line IV-IV' of FIG. 5C.
Figure 5E:
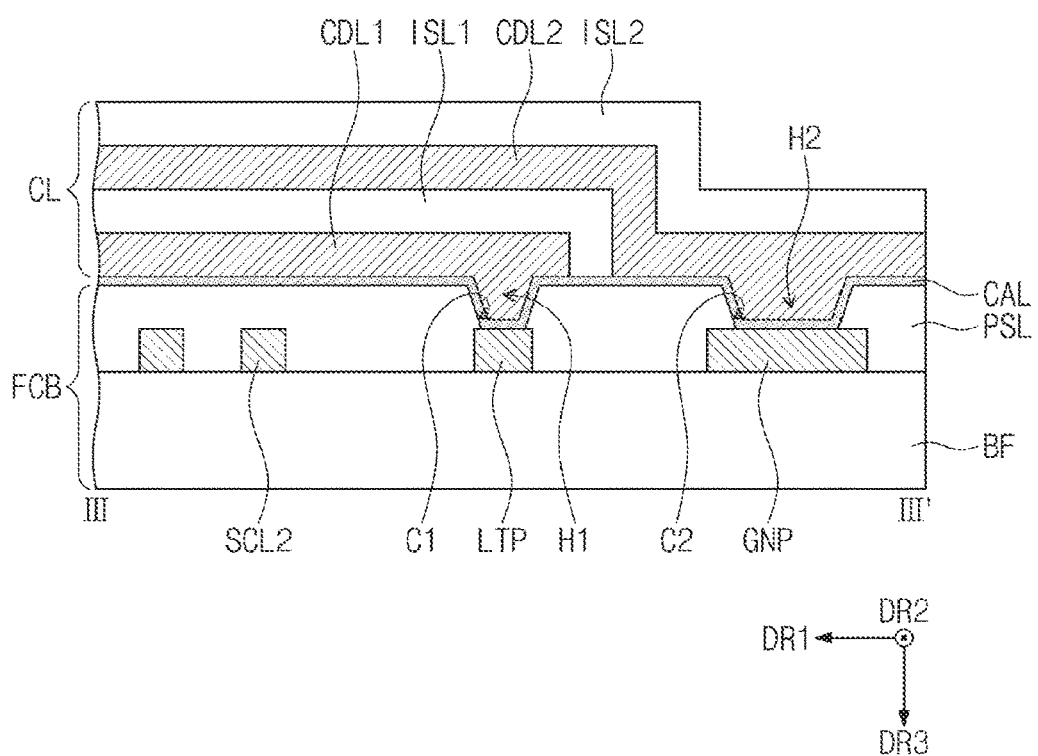
FIG. 5E is a cross-sectional view taken along a line of FIG. 5A after a cover layer is attached to the flexible circuit film of FIG. 5A.

FIG. 5A is a plan view showing the flexible circuit film FCB according to an embodiment of the present disclosure. FIG. 5B is a cross-sectional view taken along a line III-III' of FIG. 5A. FIG. 5C is a plan view showing the cover layer CL according to an embodiment of the present disclosure. FIG. 5D is a cross-sectional view taken along a line IV-IV' of FIG. 5C. FIG. 5E is a cross-sectional view taken along a line of FIG. 5A after the cover layer CL is attached to the flexible circuit film FCB of FIG. 5A. FIG. 5A shows a portion of the flexible circuit film FCB shown in FIG. 1B which overlaps the cover layer CL disposed on the flexible circuit film FCB.

Referring to FIGS. 5A and 5B, the flexible circuit film FCB may include a base film BF, the panel driver DIC, the sensor controller TIC, signal lines SCL1 and SCL2, a first conductive pattern LTP, a second conductive pattern GNP, and an insulating layer PSL. However, for the convenience of explanation, the insulating layer PSL is omitted in FIG. 5A. The flexible circuit film FCB may be formed of a material with flexibility and may be bent such that the panel driver DIC is disposed at a rear side of the display panel DP.

The base film BF may include a first area A1 and a second area A2. The panel driver DIC may be mounted in the first area A1 of the base film BF, and the sensor controller TIC and various driving elements may be mounted in the second area A2 of the base film BF.

The signal lines SCL1 and SCL2 may be disposed on the first area A1 and the second area A2 of the base film BF. The signal lines SCL1 and SCL2 may include first signal lines SCL1 and second signal lines SCL2. The first signal lines SCL1 may be signal lines disposed at a left side of the panel driver DIC. The second signal lines SCL2 may be signal lines disposed at a right side of the panel driver DIC.

One end of each of the first and second signal lines SCL1 and SCL2 may be connected to the sensor controller TIC. The other end of each of the first and second signal lines SCL1 and SCL2 may be connected to the input pads I-PD (refer to FIG. 3A). Accordingly, the signal lines SCL1 and SCL2 shown in FIG. 5A may be electrically connected to the first, second, and third signal lines SL1-1 to SL1-5, SL2-1 to SL2-4, and SL2-5 to SL2-8 of the input sensor ISP shown in FIG. 3B and may be electrically connected to the sensing electrodes IE1-1 to IE1-5 and IE2-1 to IE2-4 (refer to FIG. 3B). Each of the first and second signal lines SCL1 and SCL2 may transfer a signal applied to the input sensor ISP (refer to FIG. 3B) to the sensor controller TIC.

The first conductive pattern LTP may be disposed in the second area A2 of the base film BF. The first conductive pattern LTP may be electrically connected to the sensor controller TIC. The first conductive pattern LTP may be electrically connected to the cover layer CL via a first contact portion C1. The first conductive pattern LTP may detect the defective cover layer CL in which a delamination occurs. This will be described in detail later.

FIG. 5A shows a structure in which the first conductive pattern LTP is disposed at an outermost position of the second signal lines SCL2 as a representative example, however, a position of the first conductive pattern LTP should not be limited thereto or thereby. As an example, the first conductive pattern LTP may be disposed between the signal lines SCL1 and SCL2.

According to an embodiment, the first conductive pattern LTP may have a line shape and may extend along a portion of the signal lines SCL1 and SCL2, however, it should not be limited thereto or thereby. According to an embodiment, the first conductive pattern LTP may have a plate shape with a width equal to or greater than about 50 micrometers.

The second conductive pattern GNP may be disposed in the second area A2 of the base film BF. The second conductive pattern GNP may receive a reference voltage. As an example, the second conductive pattern GNP may be a ground line. The second conductive pattern GNP may be electrically connected to the cover layer CL via a second contact portion C2 and may provide the reference voltage to the cover layer CL.

FIG. 5A shows a structure in which one second conductive pattern GNP is disposed at a right side of the base film BF, however, the number and the position of the second conductive patterns GNP should not be limited thereto or thereby. As an example, the second conductive pattern GNP may be provided in plural and the second conductive patterns GNP may be distributed over the entire second area A2 of the base film BF.

Referring to FIG. 5B, the insulating layer PSL may be disposed on the base film BF to cover the first and second signal lines SCL1 and SCL2, the first conductive pattern LTP, and the second conductive pattern GNP. The insulating layer PSL may include an insulating ink material. As an example, the insulating layer PSL may have a black color. The insulating layer PSL may block noise from the outside.

According to an embodiment, each of the first contact portion C1 and the second contact portion C2 may be defined through the insulating layer PSL as shown in FIG. 5B. At least a portion of the first conductive pattern LTP may be exposed without being covered by the first contact portion C1 and at least a portion of the second conductive pattern GNP may be exposed without being covered by the second contact portion C2.

Referring to FIGS. 5C and 5D, the cover layer CL may include a first conductive layer CDL1, a first insulating layer ISL1, a second conductive layer CDL2, and a second insulating layer ISL2. The second conductive layer CDL2 may be disposed on the first conductive layer CDL1. The first insulating layer ISL1 may be disposed between the first conductive layer CDL1 and the second conductive layer CDL2 and may cover the first conductive layer CDL1. The second insulating layer ISL2 may be disposed on the second conductive layer CDL2. The second insulating layer ISL2 may be disposed at an uppermost position in the cover layer CL and may block the noise such as a static electricity generated from the outside.

Each of the first conductive layer CDL1 and the second conductive layer CDL2 may include a conductive material. As an example, each of the first conductive layer CDL1 and the second conductive layer CDL2 may include a metal material.

Each of the first insulating layer ISL1 and the second insulating layer ISL2 may include an adhesive insulating material, however, it should not be limited thereto or thereby. According to an embodiment, the first insulating layer ISL1 and the second insulating layer ISL2 may be coupled with the first conductive layer CDL1 and the second conductive layer CDL2, respectively, by a separate adhesive layer.

In FIG. 5C, the first conductive layer CDL1 and the second conductive layer CDL2 are indicated by a dotted line. According to an embodiment, the second conductive layer CDL2 may have an area greater than an area of the first conductive layer CDL1, and the second conductive layer CDL2 may be disposed to entirely overlap the first conductive layer CDL.

According to an embodiment, the first conductive layer CDL1 may be disposed to overlap only the second area A2, however, it should not be limited thereto or thereby. According to an embodiment, the first conductive layer CDL1 may be disposed to partially overlap the first area A1. In this case, the first conductive layer CDL1 may be disposed not to overlap the panel driver DIC (refer to FIG. 5A) disposed in the first area A1, and thus, noise may be prevented from occurring in the panel driver DIC.

According to an embodiment, the second conductive layer CDL2 may be disposed to overlap both the first and second areas A1 and A2. In this case, the second conductive layer CDL2 may be disposed to overlap the panel driver DIC and the static electricity from the outside may be blocked by the second conductive layer CDL2. Accordingly, the panel driver DIC may be prevented from being damaged.

However, configurations of the first second conductive layer CDL1 and the second conductive layer CDL2 should not be limited thereto or thereby, and the second conductive layer CDL2 may be disposed to overlap only the second area A2. In this case, only the second insulating layer ISL2 may be disposed in the first area A1, and the noise occurring in the panel driver DIC may be reduced. According to an embodiment, the first conductive layer CDL1 may include a first protruding portion H1 protruded from a lower surface of the first conductive layer CDL1. The second conductive layer CDL2 may include a second protruding portion H2 protruded from a lower surface of the second conductive layer CDL2.

Referring to FIG. 5E, the cover layer CL may be disposed on the flexible circuit film FCB. The cover layer CL may overlap the portions of the signal lines SCL1 and SCL2, the first conductive pattern LTP, and the second conductive pattern GNP. The cover layer CL may block the noise from the outside and may protect the signal lines SCL1 and SCL2, the first conductive pattern LTP, and the second conductive pattern GNP from risks such as an external impact.

Each of the first conductive layer CDL1 and the second conductive layer CDL2 of the cover layer CL may be disposed to overlap the signal lines SCL1 and SCL2 of the flexible circuit film FCB. The first protruding portion H1 of the first conductive layer CDL1 may be disposed to overlap the first contact portion C1 of the flexible circuit film FCB. The second protruding portion H2 of the second conductive layer CDL2 may be disposed to overlap the second contact portion C2 of the flexible circuit film FCB.

Accordingly, as the first protruding portion H1 of the first conductive layer CDL1 is connected to the first conductive pattern LTP exposed through the first contact portion C1, the first conductive layer CDL1 may be electrically connected to the first conductive pattern LTP. As the second protruding portion H2 of the second conductive layer CDL2 is connected to the second conductive pattern GNP exposed through the second contact portion C2, the second conductive layer CDL2 may be electrically connected to the second conductive pattern GNP.

However, it should not be limited to the embodiment of FIG. 5E, and the shapes of the first contact portion C1 and the first protruding portion H1 should not be particularly limited as long as the first contact portion C1 and the first protruding portion H1 may electrically connect the first conductive layer CDL1 to the first conductive pattern LTP1. In addition, the shapes of the second contact portion C2 and the second protruding portion H2 should not be particularly limited as long as the second contact portion C2 and the second protruding portion H2 may electrically connect the second conductive layer CDL2 to the second conductive pattern GNP. As an example, the cover layer CL may not include a protruding portion and may be attached to the flexible circuit film FCB in a bent shape corresponding to the shapes of the first and second connections C1 and C2.

According to an embodiment, the cover layer CL and the flexible circuit film FCB may be coupled with each other by a conductive adhesive layer CAL. The conductive adhesive layer CAL may include a conductive adhesive material. As an example, the conductive adhesive layer CAL may be a film in which metal particles are uniformly distributed in a synthetic resin. The metal particles may include gold, silver, platinum, nickel, copper, carbon, etc. The synthetic resin may include a material such as epoxy, silicon, polyimide, polyurethane, etc. The conductive adhesive layer CAL may electrically connect the first conductive layer CDL1 to the first conductive pattern LTP and may electrically connect the second conductive layer CDL2 to the second conductive pattern GNP. The conductive adhesive layer CAL may be an anisotropic conductive adhesive layer.

When the cover layer CL is attached to the flexible circuit film FCB, the second conductive layer CDL2 may be electrically connected to the second conductive pattern GNP to receive the reference voltage from the second conductive pattern GNP. As an example, the second conductive layer CDL2 may be maintained in a grounded state. Accordingly, a parasitic capacitance between the first and second conductive layers CDL1 and CDL2 and the signal lines SCL1 and SCL2 may be maintained at a constant level without being changed.

However, the cover layer CL may be separated from the flexible circuit film FCB at the first contact portion C1 and the second contact portion C2, and thus, the cover layer CL may be delaminated. That is, the first conductive layer CDL1 and the second conductive layer CDL2 may not be electrically connected to the first conductive pattern LTP and the second conductive pattern GNP, respectively. The first conductive layer CDL1 and the second conductive layer CDL2 may be recognized as a floating metal, and, as a result, a value of the parasitic capacitance generated between the second conductive layer CDL2 and the signal lines SCL1 and SCL2, between the first conductive layer CDL1 and the signal lines SCL1 and SCL2, and between the signal lines SCL1 and SCL2 adjacent to each other may be changed. Accordingly, a ghost touch phenomenon in which a touch is sensed even though a touch event does not occur may be generated, and the sensing ability may be deteriorated.

According to the present disclosure, the delamination of the cover layer CL from the flexible circuit film FCB may be identified by the first conductive pattern LTP. In a case where the delamination of the cover layer CL occurs, the value of the parasitic capacitance between the first conductive pattern LTP and the first conductive layer CDL1 and between the first conductive pattern LTP and the signal lines adjacent thereto may be changed. Since the first conductive pattern LTP may provide the value of the parasitic capacitance occurring near the first conductive pattern LTP to the sensor controller TIC, the first conductive pattern LTP may sense a change in value of the parasitic capacitance and may identify the delamination of the cover layer CL.

Accordingly, the defective cover layer that is delaminated may be detected by performing a delamination test of the cover layer CL in the manufacturing process of the display device DD, and the defective cover layer may prevented. Thus, the display device DD may be provided with improved sensing reliability.

Figure 6A:
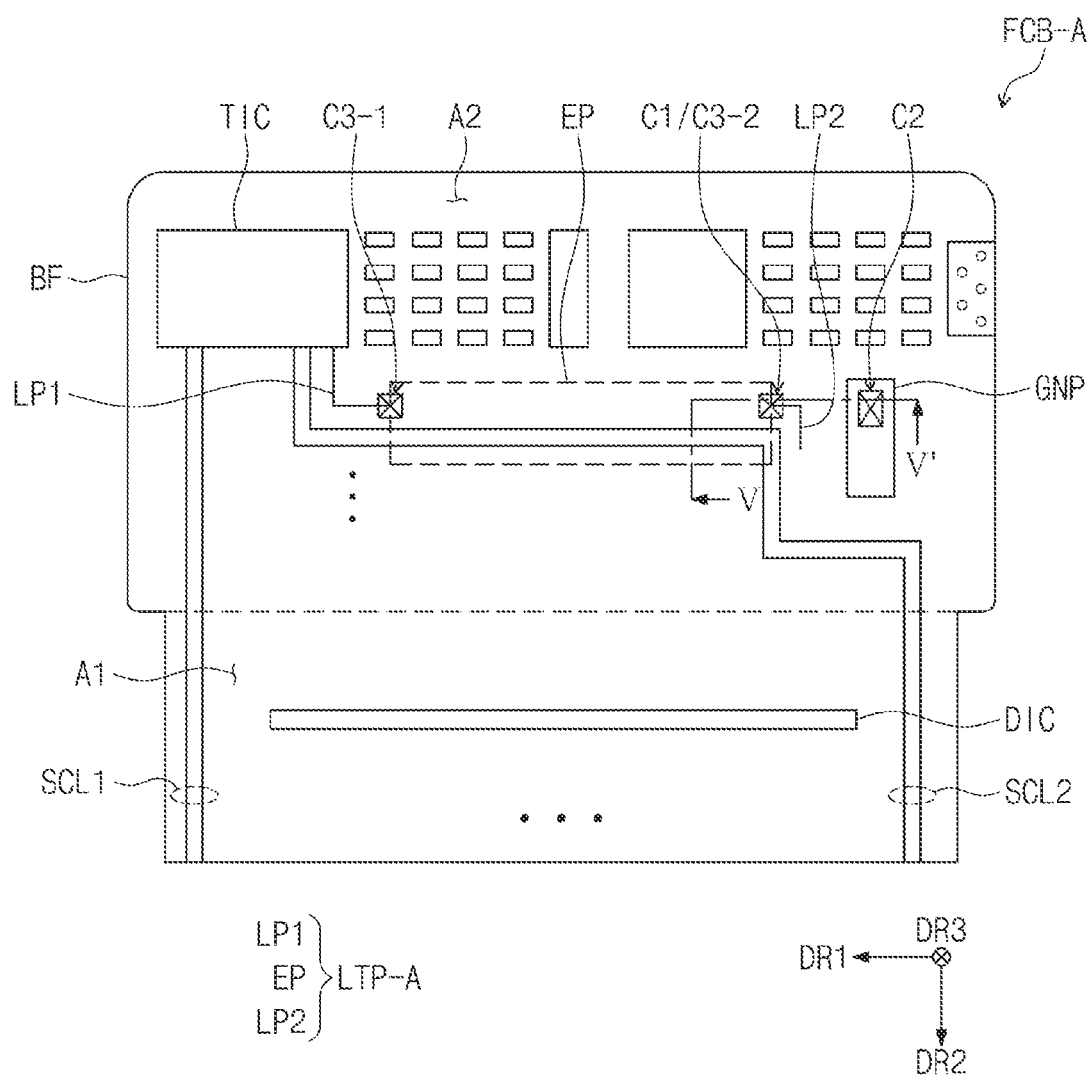
FIG. 6A is a plan view showing a flexible circuit film according to an embodiment of the present disclosure.
Figure 6B:
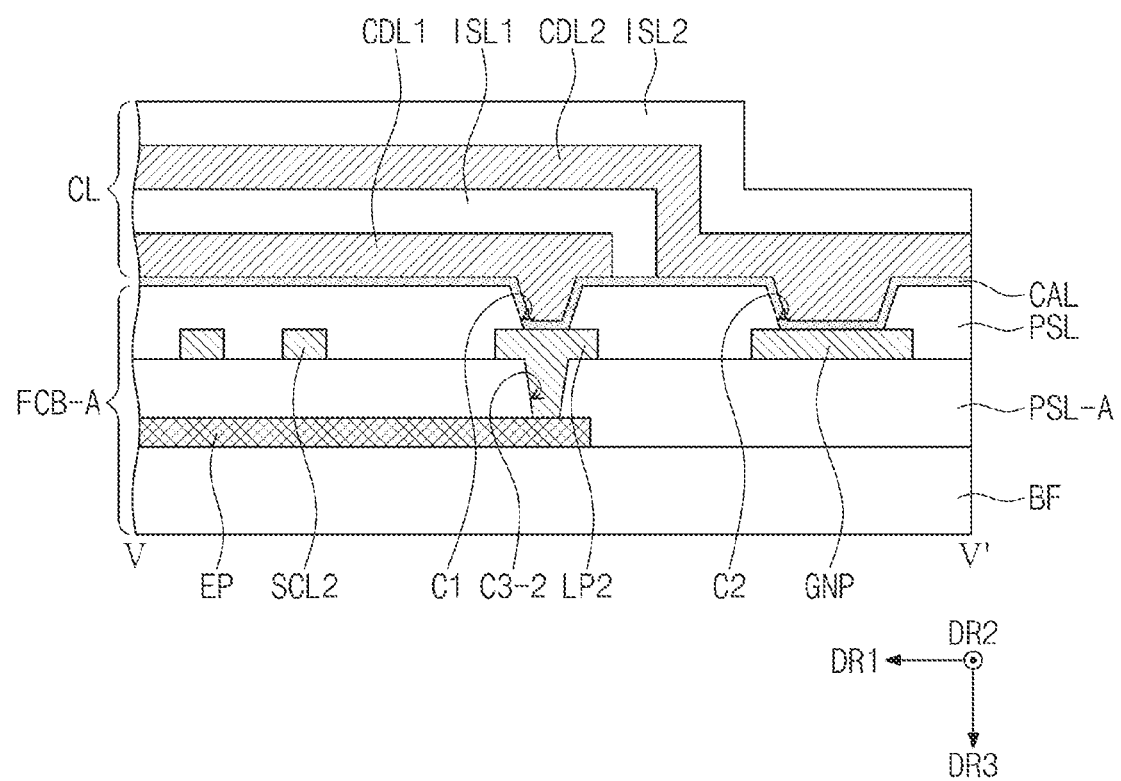
FIG. 6B is a cross-sectional view taken along a line V-V' of FIG. 6A after a cover layer is attached to the flexible circuit film of FIG. 6A.

FIG. 6A is a plan view showing a flexible circuit film FCB-A according to an embodiment of the present disclosure. FIG. 6B is a cross-sectional view taken along a line V-V' of FIG. 6A. According to an embodiment, the flexible circuit film FCB-A may include a first conductive pattern LTP-A having a plate shape and may include a plurality of insulating layers PSL-A and PSL. FIG. 6B shows a cross-section of the flexible circuit film FCB-A to which the cover layer CL described with reference to FIGS. 5C and 5D is attached, and thus, descriptions will be focused on different features of the flexible circuit film FCB-A.

According to an embodiment, the first conductive pattern LTP-A may include a first line portion LP1, a second line portion LP2, and an electrode portion EP. In FIG. 6A, the electrode portion EP is indicated by a dotted line. The electrode portion EP may be disposed between the first line portion LP1 and the second line portion LP2.

The electrode portion EP may have a width equal to or greater than about 50 micrometers in the second direction DR2. The electrode portion EP may have a width greater than that of the first line portion LP1 and the second line portion LP2 in a plan view.

Referring to FIG. 6B, the flexible circuit film FCB-A may include a base film BF and the insulating layers PSL-A and PSL disposed on the base film BF. The insulating layers PSL-A and PSL may include an intermediate insulating layer PSL-A disposed on the base film BF and an insulating layer PSL disposed on the intermediate insulating layer PSL-A.

According to an embodiment, the electrode portion EP may be disposed on the base film BF, and signal lines SCL1 and SCL2, the first line portion LP1, the second line portion LP2, and a second conductive pattern GNP may be disposed on the intermediate insulating layer PSL-A. Accordingly, the electrode portion EP and the first line portion LP1 or the electrode portion EP and the second line portion LP2 may be disposed on different layers from each other.

FIG. 6B shows a structure in which the electrode portion EP is disposed below the first and second line portions LP1 and LP2, however, the structure should not be limited thereto or thereby. As an example, the electrode portion EP may be disposed above the first and second line portions LP1 and LP2.

According to an embodiment, third contact portions C3-1 and C3-2 may be defined through the intermediate insulating layer PSL-A. At least portions of the electrode portion EP may be exposed through the third contact portions C3-1 and C3-2. Accordingly, the electrode portion EP may be electrically connected to the first and second line portions LP1 and LP2 through the third contact portions C3-1 and C3-2, respectively.

However, in a case where the cover layer CL is delaminated from the flexible circuit film FCB-A, a first conductive layer CDL1 and the first conductive pattern LTP-A may be disconnected and/or a second conductive layer CDL2 and the second conductive pattern GNP may be disconnected, and thus, a value of the parasitic capacitance between the first conductive pattern LTP-A and the first conductive layer CDL1 and between the first conductive pattern LTP-A and the signal lines disposed adjacent thereto may be changed.

According to an embodiment, the electrode portion EP may be disposed to overlap a portion of second signal lines SCL2. Accordingly, when the cover layer CL is delaminated, the value of the parasitic capacitance between the electrode portion EP and the second signal lines SCL2 may increase.

Therefore, it is possible to easily and precisely detecting an occurrence of the delamination, and thus, the sensing reliability of the input sensor ISP may be improved.

Figure 7A:
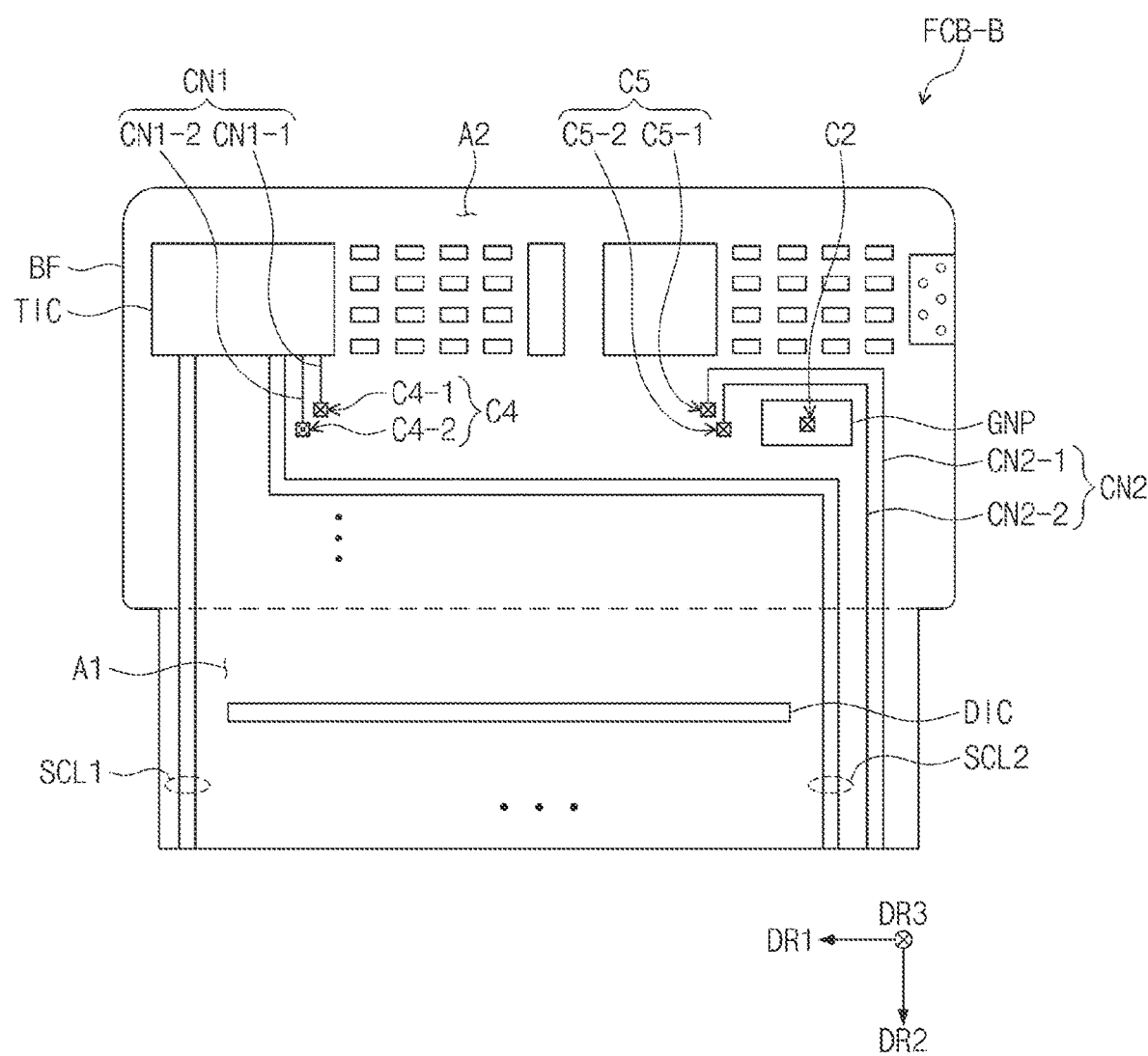
FIG. 7A is a plan view showing a flexible circuit film according to an embodiment of the present disclosure.
Figure 7B:
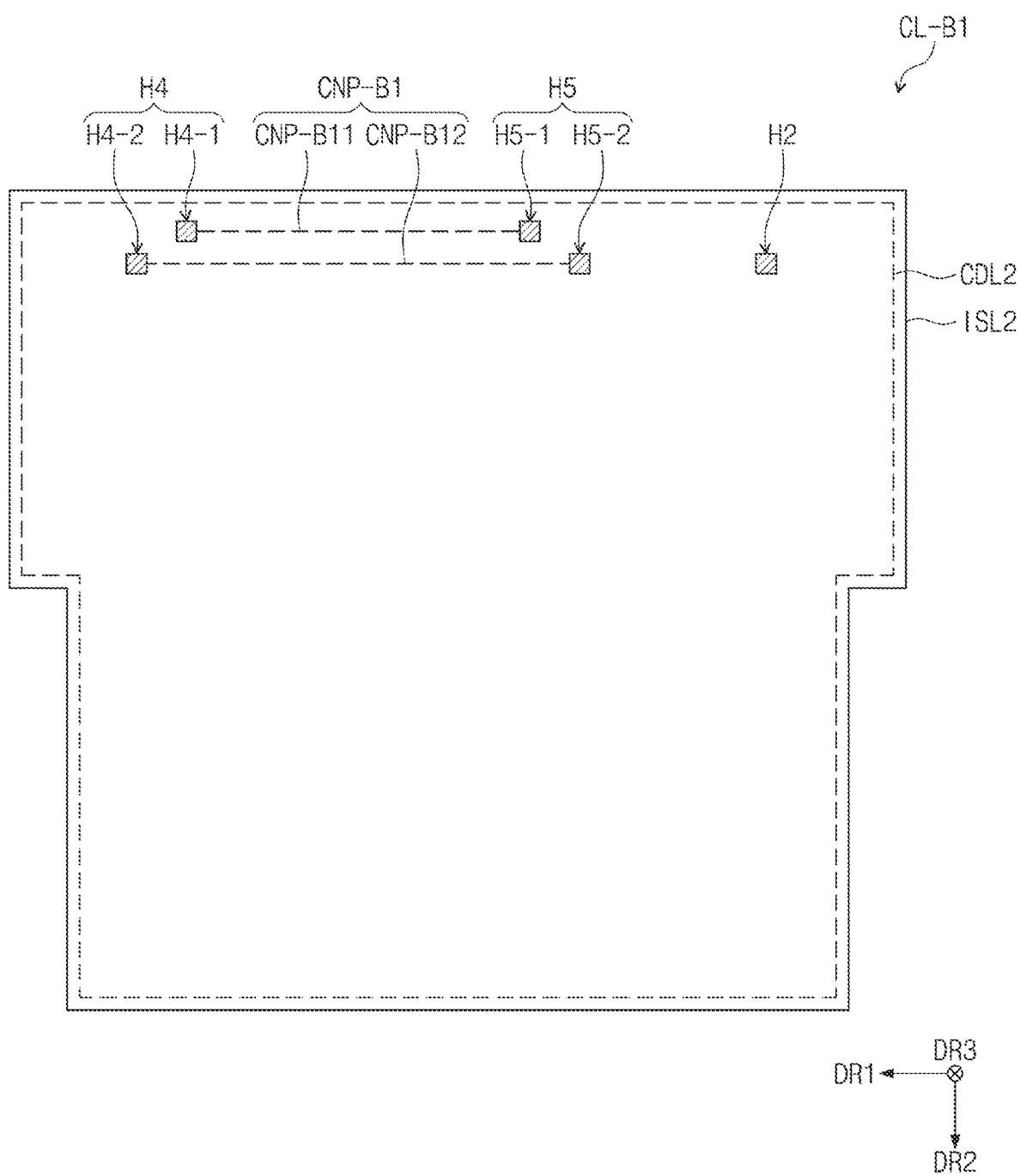
FIG. 7B is a plan view showing a cover layer according to an embodiment of the present disclosure.
Figure 7C:
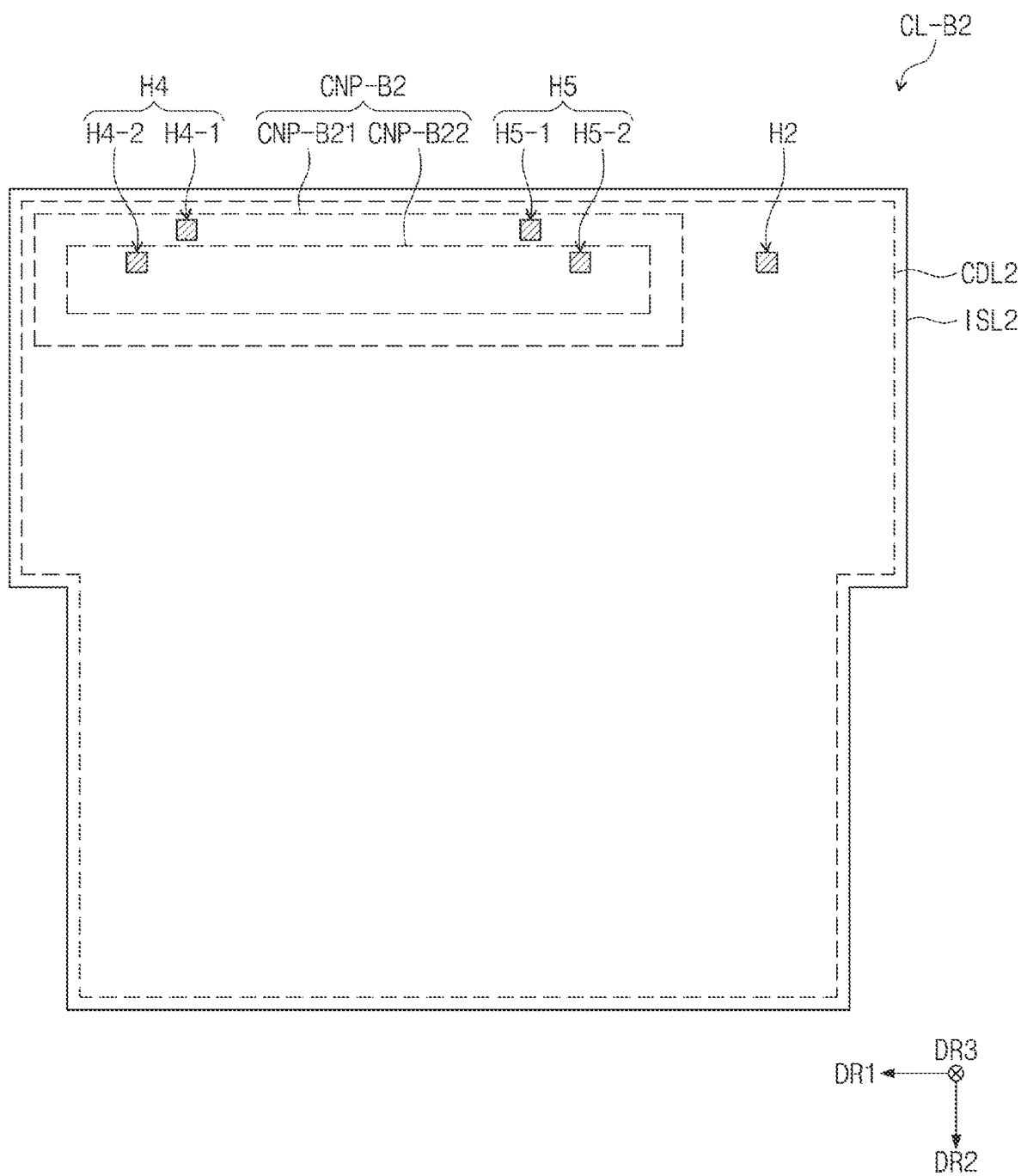
FIG. 7C is a plan view showing a cover layer according to an embodiment of the present disclosure.

FIG. 7A is a plan view showing a flexible circuit film FCB-B according to an embodiment of the present disclosure. FIG. 7B is a plan view showing a cover layer CL-B1 according to an embodiment of the present disclosure. FIG. 7C is a plan view showing a cover layer CL-B2 according to an embodiment of the present disclosure. The cover layer CL-B1 shown in FIG. 7B and the cover layer CL-B2 shown in FIG. 7C may be attached to the flexible circuit film FCB-B shown in FIG. 7A. In FIGS. 7A to 7C, the same/similar reference numerals denote the same/similar elements in FIGS. 1A to 6B, and thus, detailed descriptions of the same elements will be omitted.

Referring to FIG. 7A, the flexible circuit film FCB-B may include a base film BF, a panel driver DIC, a sensor controller TIC, signal lines SCL1 and SCL2, a first conductive line CN1, a second conductive line CN2, and a conductive pattern GNP. The panel driver DIC, the sensor controller TIC, the signal lines SCL1 and SCL2, the first conductive line CN1, the second conductive line CN2, and the conductive pattern GNP may be disposed on the base film BF. Although not shown in FIG. 7A, the flexible circuit film FCB-B may further include an insulating layer PSL (refer to FIG. 5B) disposed on the base film BF to cover the signal lines SCL1 and SCL2, the first conductive line CN1, the second conductive line CN2, and the conductive pattern GNP.

The first conductive line CN1 may be disposed in a second area A2 of the base film BF. One end of the first conductive line CN1 may be electrically connected to the sensor controller TIC. The other end of the first conductive line CN1 may be electrically connected to the cover layer CL-B1 or CL-B2 (refer to FIG. 7B or FIG. 7C) by a fourth contact portion C4.

The second conductive line CN2 may be disposed in a first area A1 and the second area A2 of the base film BF. The second conductive line CN2 may extend along the signal lines SCL1 and SLC2 and may be electrically connected to corresponding signal lines among the first, second, and third signal lines SL1-1 to SL1-5, SL2-1 to SL2-4, and SL2-5 to SL2-8 (refer to FIG. 3B) of the input sensor ISP (refer to FIGS. 1B and 3B). That is, one end of the second conductive line CN2 may be electrically connected to the sensing electrode of the input sensor ISP. The other end of the second conductive line CN2 may be electrically connected to the cover layer CL-B1 or CL-B2 by a fifth contact portion C5.

According to an embodiment, each of the first conductive line CN1 and the second conductive line CN2 may be provided in plural. FIG. 7A shows two first conductive lines CN1 and two second conductive lines CN2. The first conductive line CN1 may include a first-first conductive line CN1-1 partially exposed through a fourth-first contact portion C4-1 and a first-second conductive line CN1-2 partially exposed through a fourth-second contact portion C4-2. The second conductive line CN2 may include a second-first conductive line CN2-1 partially exposed through a fifth-first contact portion C5-1 and a second-second conductive line CN2-2 partially exposed through a fifth-second contact portion C5-2.

Referring to FIG. 7B, the cover layer CL-B1 may include at least one connection pattern CNP-B1, a conductive layer CDL2 disposed on the connection pattern CNP-B1, and at least one insulating layer ISL2 disposed on the conductive layer CDL2. The connection pattern CNP-B1 shown in FIG. 7B may be formed by patterning the first conductive layer CDL1 described with reference to FIGS. 5C and 5D. The conductive layer CDL2 shown in FIG. 7B may correspond to the second conductive layer CDL2 described with reference to FIGS. 5C and 5D, and the insulating layer ISL2 shown in FIG. 7B may correspond to the second insulating layer ISL2 described with referent to FIGS. 5C and 5D. Although not shown in figures, the cover layer CL-B1 of FIG. 7B may further include the first insulating layer ISL1 described with reference to FIGS. 5C and 5D. The first insulating layer ISL1 may insulate the connection pattern CNP-B1 from the conductive layer CDL2.

Referring to FIG. 7B, the connection pattern CNP-B1 may include at least one connection pattern CNP-B11 and CNP-B12. The connection pattern CNP-B11 and CNP-B12 may include a first connection pattern CNP-B11 and a second connection pattern CNP-B12. Each of the first connection pattern CNP-B11 and the second connection pattern CNP-B12 may have a line shape. The first connection pattern CNP-B11 may be electrically connected to the first-first and second-first conductive lines CN1-1 and CN2-1 (refer to FIG. 7A) by a conductive adhesive layer, and the second connection pattern CNP-B12 may be electrically connected to the first-second and second-second conductive lines CN1-2 and CN2-2 (refer to FIG. 7A) by the conductive adhesive layer. The conductive layer CDL2 may be electrically connected to the conductive pattern GNP by a conductive adhesive layer.

The first connection pattern CNP-B11 may be provided with a fourth-first protruding portion H4-1 and a fifth-first protruding portion H5-1 which are respectively defined at one side and the other side of the first connection pattern CNP-B11, and the second connection pattern CNP-B12 may be provided with a fourth-second protruding portion H4-2 and a fifth-second protruding portion H5-2 which are respectively defined at one side and the other side of the second connection pattern CNP-B12. The cover layer CL-B1 may be disposed such that the fourth-first, fourth-second, fifth-first, and fifth-second protruding portions H4-1, H4-2, H5-1, and H5-2 respectively correspond to the fourth-first, fourth-second, fifth-first, and fifth-second contact portions C4-1, C4-2, C5-1, and C5-2 (refer to FIG. 7A).

The first connection pattern CNP-B11 may be electrically connected to the first-first conductive line CN1-1 via the fourth-first protruding portion H4-1 and may be electrically connected to the second-first conductive line CN2-1 through the fifth-first protruding portion H5-1. The second connection pattern CNP-B12 may be electrically connected to the first-second conductive line CN1-2 through the fourth-second protruding portion H4-2 and may be electrically connected to the second-second conductive line CN2-2 through the fifth-second protruding portion H5-2.

That is, the first-first conductive line CN1-1 and the second-first conductive line CN2-1 may be electrically connected to each other via the first connection pattern CNP-B11 of the cover layer CL-B1, and the first-second conductive line CN1-2 and the second-second conductive line CN2-2 may be electrically connected to each other via the second connection pattern CNP-B12 of the cover layer CL-B1.

The first conductive line CN1 and the second conductive line CN2 may be electrically connected to each other by the connection pattern CNP-B1 of the cover layer CL-B1, and as a result, the first conductive line CN1 may be electrically connected to the input sensor ISP (refer to FIG. 1B). Accordingly, the first and second conductive lines CN1 and CN2 may transmit signals applied thereto from the input sensor ISP to the sensor controller TIC (refer to FIG. 7A).

As described above, as the signal lines SCL1 and SCL2 are connected to the cover layer CL-B1 while portions of the signal lines SCL1 and SCL2 disposed on the flexible circuit film FCB-B are being omitted, the size of the flexible circuit film FCB-B may be reduced. The interference between the flexible circuit film FCB-B and other components may be reduced due to the flexible circuit film FCB-B with reduced size, and thus, a degree of freedom in manufacturing the other components may increase.

Referring to FIG. 7C, the cover layer CL-B2 may include a connection pattern CNP-B2, a conductive layer CDL2 disposed on the connection pattern CNP-B2, and an insulating layer ISL2 disposed on the conductive layer CDL2. Different from the cover layer CL-B1 of FIG. 7B, the connection pattern CNP-B2 of FIG. 7C may include a first connection pattern CNP-B21 and a second connection pattern CNP-B22, which are disposed on different layers from each other. Although not shown in figures, an insulating layer may be disposed between the first connection pattern CNP-B21 and the second connection pattern CNP-B22 and between the conductive layer CDL2 and the first connection pattern CNP-B21. In FIG. 7C, the same/similar reference numerals denote the same/similar elements in FIG. 7B, and thus, detailed descriptions of the same/similar elements will be omitted.

FIG. 7C shows a structure in which two connection patterns are included, and the connection patterns CNP-B2 may include the first connection pattern CNP-B21 and the second connection pattern CNP-B22 disposed under the first connection pattern CNP-B21.

According to an embodiment, the first connection pattern CNP-B21 may be electrically connected to a first-first conductive line CN1-1 and a second-first conductive line CN2-1 via a fourth-first contact portion C4-1 and a fifth-first contact portion C5-1 described with reference to FIG. 7A. The second connection pattern CNP-B22 may be electrically connected to a first-second conductive line CN1-2 and a second-second conductive line CN2-2 via a fourth-second contact portion C4-2 and a fifth-second contact portion C5-2 described with reference to FIG. 7A.

That is, each of the first and second connection patterns CNP-B21 and CNP-B22 may be electrically connected to a corresponding first conductive line among first conductive lines CN1 (refer to FIG. 7A) and a corresponding second conductive line among second conductive lines CN2 (refer to FIG. 7A), and thus, the first conductive line may be electrically connected to the second conductive line. Accordingly, the first and second conductive lines CN1 and CN2 may transmit signals applied thereto from the input sensor ISP (refer to FIG. 1B) to a sensor controller TIC (refer to FIG. 7A).

FIG. 7C shows a structure in which each of the fourth-first protruding portion H4-1 and the fifth-first protruding portion H5-1 is disposed not to overlap the second connection pattern CNP-B22, however, positions of the protruding portions should not be limited thereto or thereby. As an example, each of the fourth-first protruding portion H4-1 and the fifth-first protruding portion H5-1 may be disposed to overlap the second connection pattern CNP-B22.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A display device comprising:
   a display module comprising a display panel and an input sensor comprising a sensing electrode and disposed on the display panel;
   a flexible circuit film electrically connected to the display module and comprising a first conductive pattern, a second conductive pattern receiving a reference voltage, and a signal line electrically connected to the sensing electrode, wherein the first conductive pattern, the second conductive pattern and signal line are disposed on a base film;
   a sensor controller electrically connected to the signal line and the second conductive pattern and disposed on the flexible circuit film; and
   a cover layer disposed on an upper surface of the flexible circuit film wherein the base film is below the cover layer, the cover layer comprising:
   a first conductive layer electrically connected to the first conductive pattern and overlapping the signal line,
   a second conductive layer disposed on the first conductive layer, electrically connected to the second conductive pattern, and overlapping the signal line, and
   a first insulating layer disposed between the first conductive layer and the second conductive layer.

2. The display device of claim 1, further comprising a conductive adhesive layer disposed between the cover layer and the flexible circuit film to electrically connect the first conductive pattern to the first conductive layer or to electrically connect the second conductive pattern to the second conductive layer.

3. The display device of claim 1, wherein the first conductive pattern has a line shape and extends along a portion of the signal line.

4. The display device of claim 1, wherein the first conductive pattern comprises:
   a first line portion electrically connected to the sensor controller;
   a second line portion electrically connected to the first conductive layer; and
   an electrode portion disposed between the first line portion and the second line portion, a width of the electrode portion being greater than a width of the first line portion.

5. The display device of claim 4, wherein the width of the electrode portion is greater than or equal to about 50 micrometers.

6. The display device of claim 4, wherein the electrode portion overlaps the signal line in a plan view.

7. The display device of claim 4, wherein the first line portion is disposed on a layer different from a layer on which the electrode portion is disposed.

8. The display device of claim 7, wherein the signal line is disposed between the electrode portion and the first conductive layer.

9. The display device of claim 1, wherein the cover layer further comprises a second insulating layer disposed on the second conductive layer.

10. The display device of claim 1, wherein the flexible circuit film further comprises an insulating layer disposed on the first conductive pattern, the second conductive pattern, and the signal line.

11. The display device of claim 10, wherein the insulating layer is provided with a first contact portion defined therethrough to expose a portion of the first conductive pattern, and wherein the first conductive layer is electrically connected to the first conductive pattern through the first contact portion.

12. The display device of claim 10, wherein the insulating layer is provided with a second contact portion defined therethrough to expose a portion of the second conductive pattern, and wherein the second conductive layer is electrically connected to the second conductive pattern through the second contact portion.

13. The display device of claim 1, wherein the sensing electrode is provided in plural, and the sensing electrodes comprise a first sensing electrode and a second sensing electrode insulated from the first sensing electrode to form a mutual capacitance.

\* \* \* \* \*